United States Patent
Kitou et al.

(10) Patent No.: US 10,677,537 B2
(45) Date of Patent: Jun. 9, 2020

(54) EVAPORATOR

(71) Applicant: DENSO CORPORATION, Kariya, Aichi-pref. (JP)

(72) Inventors: Yuusuke Kitou, Kariya (JP); Jun Abei, Kariya (JP); Norihide Kawachi, Kariya (JP); Eiichi Torigoe, Kariya (JP); Shota Chatani, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 123 days.

(21) Appl. No.: 15/569,838

(22) PCT Filed: Apr. 19, 2016

(86) PCT No.: PCT/JP2016/002097
§ 371 (c)(1),
(2) Date: Oct. 27, 2017

(87) PCT Pub. No.: WO2016/174852
PCT Pub. Date: Nov. 3, 2016

(65) Prior Publication Data
US 2018/0306525 A1 Oct. 25, 2018

(30) Foreign Application Priority Data

Apr. 30, 2015 (JP) .................... 2015-092589
Apr. 12, 2016 (JP) .................... 2016-079306

(51) Int. Cl.
*F28F 1/12* (2006.01)
*B60H 1/00* (2006.01)
(Continued)

(52) U.S. Cl.
CPC ............ *F28F 1/126* (2013.01); *B60H 1/005* (2013.01); *B60H 1/00335* (2013.01);
(Continued)

(58) Field of Classification Search
CPC .. F28F 1/126; F28F 1/40; F28D 20/02; F28D 20/026; F28D 1/05366; F28D 2021/0085; F28D 2020/0013; Y02E 60/145
See application file for complete search history.

(56) References Cited

U.S. PATENT DOCUMENTS 6,119,767 A * 9/2000 Kadota ............... F28D 15/0233
165/104.33
6,170,567 B1 * 1/2001 Nakada ................ F28D 1/0375
165/153
(Continued)

FOREIGN PATENT DOCUMENTS

CN         104114970 A    10/2014
JP         S580033097 A   2/1983
(Continued)

*Primary Examiner* — Kun Kai Ma
(74) *Attorney, Agent, or Firm* — Harness, Dickey & Pierce, P.L.C.

(57) ABSTRACT

An evaporator includes multiple cold storage mechanisms for lowering a temperature of a cold storage material housed inside a cold storage container by heat exchange with a refrigerant. The multiple cold storage mechanisms include a first cold storage mechanism and a second cold storage mechanism higher in heat storage-and-radiation performance than the first cold storage mechanism.

23 Claims, 25 Drawing Sheets

(51) Int. Cl.
    *F25B 39/02*     (2006.01)
    *F28D 20/02*     (2006.01)
    *F28F 1/40*     (2006.01)
    *F28D 1/053*     (2006.01)
    *F28D 21/00*     (2006.01)
    *F28D 20/00*     (2006.01)

(52) U.S. Cl.
    CPC .......... *F25B 39/02* (2013.01); *F28D 1/05366* (2013.01); *F28D 20/02* (2013.01); *F28D 20/026* (2013.01); *F28F 1/40* (2013.01); *F28D 2020/0013* (2013.01); *F28D 2021/0085* (2013.01); *Y02E 60/145* (2013.01)

(56) References Cited

U.S. PATENT DOCUMENTS

| | | | |
|---|---|---|---|
| 7,628,199 B2 * | 12/2009 | Rothenhofer | F28F 3/027 165/146 |
| 8,479,803 B2 | 7/2013 | Lim et al. | |
| 9,746,217 B2 * | 8/2017 | Hirayama | F25B 39/022 |
| 10,006,680 B2 * | 6/2018 | Hirayama | F25B 39/022 |
| 10,139,170 B2 * | 11/2018 | Hongo | F28D 20/02 |
| 2002/0088246 A1 | 7/2002 | Bureau et al. | |
| 2002/0088248 A1 | 7/2002 | Bureau et al. | |
| 2003/0159455 A1 * | 8/2003 | Aikawa | B60H 1/005 62/225 |
| 2004/0069457 A1 * | 4/2004 | Park | F28D 15/0266 165/104.21 |
| 2004/0093889 A1 | 5/2004 | Bureau et al. | |
| 2004/0104020 A1 | 6/2004 | Haller et al. | |
| 2005/0166632 A1 | 8/2005 | Bureau et al. | |
| 2005/0188717 A1 * | 9/2005 | Aikawa | F25B 41/00 62/434 |
| 2007/0068650 A1 | 3/2007 | Haller et al. | |
| 2010/0065244 A1 * | 3/2010 | Yokoyama | F28D 1/05383 165/10 |
| 2010/0307180 A1 * | 12/2010 | Yamada | F25D 17/005 62/285 |
| 2011/0239696 A1 * | 10/2011 | Takagi | B60H 1/00335 62/524 |
| 2012/0042687 A1 * | 2/2012 | Kamoshida | F25B 39/02 62/524 |
| 2012/0204597 A1 * | 8/2012 | Karl | F25B 39/022 62/529 |
| 2012/0285668 A1 * | 11/2012 | Abei | F25B 39/04 165/143 |
| 2013/0047663 A1 * | 2/2013 | Kamoshida | F25B 39/02 62/524 |
| 2014/0083662 A1 | 3/2014 | Yamada et al. | |
| 2014/0083663 A1 | 3/2014 | Yamada et al. | |
| 2014/0090826 A1 | 4/2014 | Yamada et al. | |
| 2015/0007971 A1 * | 1/2015 | Lee | F28F 9/02 165/173 |
| 2015/0068718 A1 * | 3/2015 | Ota | F28D 20/02 165/181 |
| 2015/0153090 A1 | 6/2015 | Yamada et al. | |
| 2015/0168047 A1 * | 6/2015 | Danjyo | F28D 1/05383 62/467 |
| 2015/0184909 A1 * | 7/2015 | Haseba | F25B 39/02 62/129 |
| 2015/0211806 A1 * | 7/2015 | Ota | F28D 20/02 165/10 |
| 2015/0345871 A1 * | 12/2015 | Jeon | F28F 9/0204 165/173 |
| 2015/0360534 A1 * | 12/2015 | Higashiyama | B60H 1/005 62/430 |
| 2016/0114646 A1 | 4/2016 | Danjyo et al. | |
| 2016/0252281 A1 * | 9/2016 | Abei | F25B 39/02 62/434 |
| 2016/0347146 A1 * | 12/2016 | Wijaya | B60H 1/00335 |
| 2018/0162189 A1 * | 6/2018 | Kamoshida | B60H 1/00335 |

FOREIGN PATENT DOCUMENTS

| | | | | |
|---|---|---|---|---|
| JP | 2000205777 A | 7/2000 | | |
| JP | 2006503253 A | 1/2006 | | |
| JP | 2008020177 A | 1/2008 | | |
| JP | 2009068742 A | 4/2009 | | |
| JP | 4343472 B2 | 10/2009 | | |
| JP | 2010043779 A | 2/2010 | | |
| JP | 4568493 B2 | 10/2010 | | |
| JP | 2011012947 A * | 1/2011 | .......... F28D 1/0333 |
| JP | 2013018299 A | 1/2013 | | |
| JP | 2013216131 A | 10/2013 | | |
| JP | 2013256262 A | 12/2013 | | |
| JP | 5408017 B2 | 2/2014 | | |
| JP | 5444782 B2 | 3/2014 | | |
| JP | 2017116195 A * | 6/2017 | | |
| WO | WO-2013042273 A1 | 3/2013 | | |
| WO | WO-2013186983 A1 | 12/2013 | | |
| WO | WO-2014/196163 A1 | 12/2014 | | |

* cited by examiner

FIG. 5
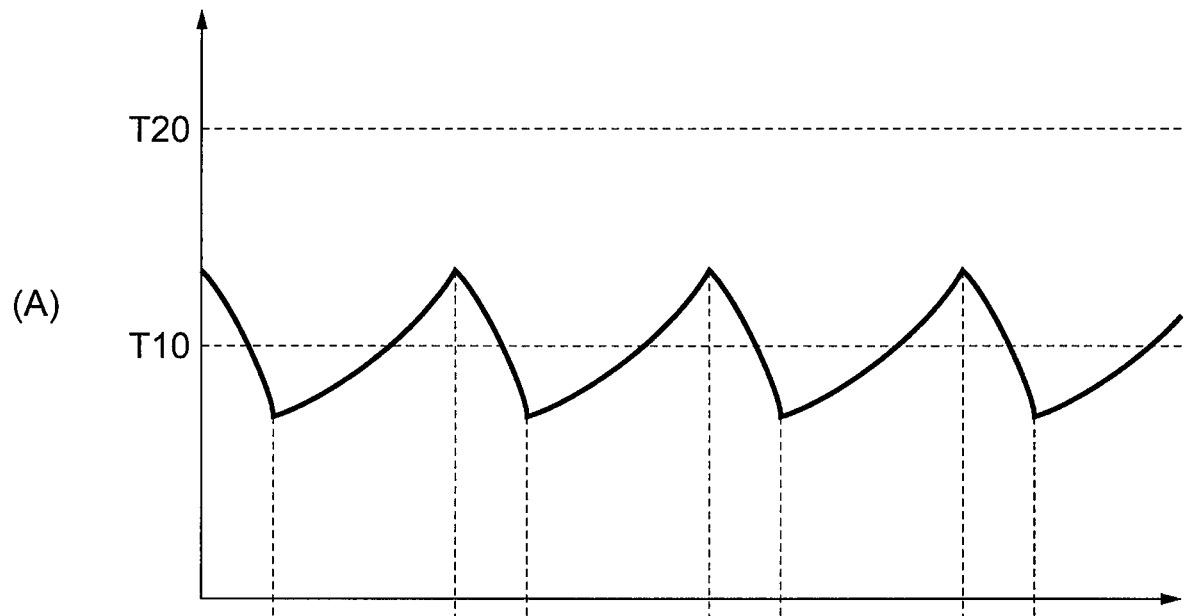
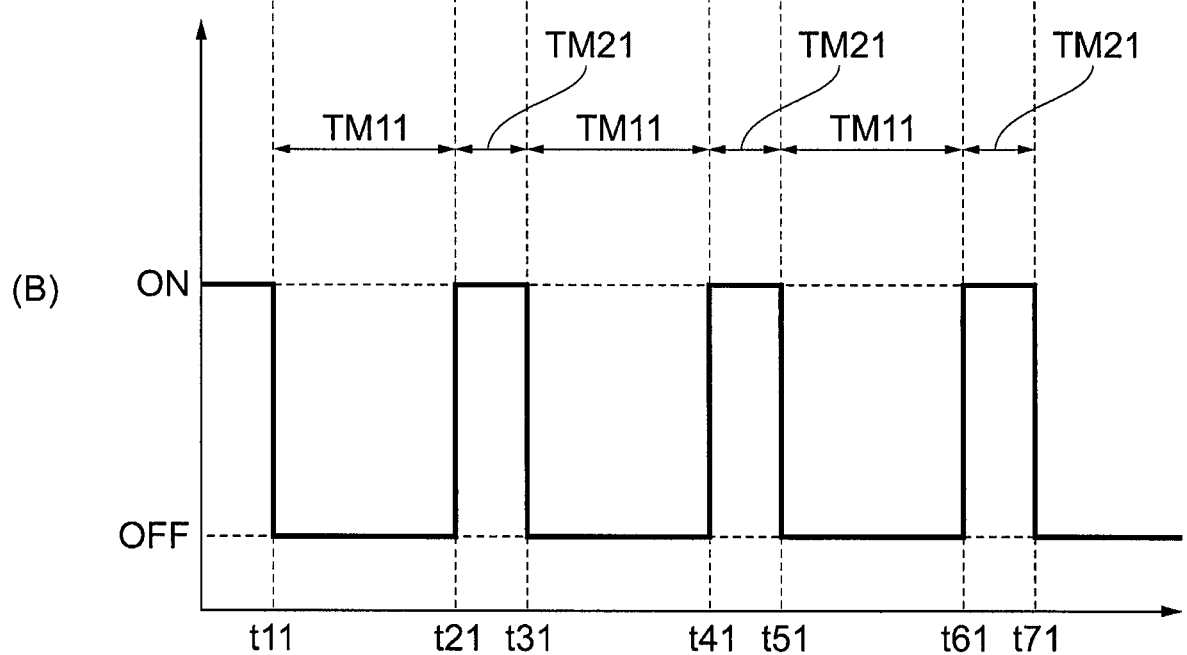

EVAPORATOR

CROSS REFERENCE TO RELATED APPLICATIONS

This application is a U.S. National Phase Application under 35 U.S.C. 371 of International Application No. PCT/JP2016/002097 filed on Apr. 19, 2016 and published in Japanese as WO 2016/174852 A1 on Nov. 3, 2016. This application is based on and claims the benefit of priority from Japanese Patent Applications No. 2015-092589 filed on Apr. 30, 2015, and No. 2016-079306 filed on Apr. 12, 2016. The entire disclosures of all of the above applications are incorporated herein by reference.

TECHNICAL FIELD

The present disclosure relates to an evaporator that cools air by heat exchange with a refrigerant passing through an inside of the evaporator.

BACKGROUND ART

An evaporator used as a part of a refrigeration cycle in an air conditioning apparatus evaporates a liquid phase refrigerant inside the air conditioning apparatus to lower a temperature of the refrigerant, and thereby cools the air by heat exchange with the refrigerant.

In the air conditioning apparatus for a vehicle, a compressor is operated by a driving force of an internal combustion engine, and thereby circulates the refrigerant. For that reason, since the circulation of the refrigerant is stopped in a state where the internal combustion engine is stopped, the air passing through the evaporator cannot be cooled.

In recent years, vehicles that perform so-called idle stop, in which the internal combustion engine is automatically stopped at the time of temporary stop, are in widespread use. In such a vehicle, the internal combustion engine stops relatively frequently during operation, and the compressor stops each time. At that time, when the air is no longer cooled as described above, a temperature in a vehicle interior rises and an occupant feels uncomfortable.

Therefore, an evaporator having a cold storage mechanism has been proposed and already put to practical use (refer to, for example, Patent Literature 1 below). The cold storage mechanism is a mechanism, in which a cold storage material such as paraffin is housed inside a container, and is disposed in contact with a tube or the like of the evaporator through which the refrigerant passes.

When the compressor is operating by the driving force of the internal combustion engine, the cold storage mechanism (cold storage container) is cooled by heat exchange with the refrigerant which has become low temperature in the evaporator, and the cold storage material housed in the cold storage container is solidified.

Thereafter, even if the idle stop is performed and the circulation of the refrigerant is stopped, the cold storage mechanism and the tube disposed in the vicinity of the cold storage mechanism are maintained at a low temperature by the solidified cold storage material. For that reason, the air blown into the vehicle interior through the evaporator can be continuously cooled for a while.

PRIOR ART LITERATURE

Patent Literature

Patent Literature 1: JP 2006-503253 A

SUMMARY

During a normal operation that is not the idle stop state, the compressor of the air conditioning apparatus may be operated intermittently rather than continuously. Such an intermittent operation is carried out for, for example, the purpose of limiting a temperature decrease of the evaporator to prevent the adhesion of frost, or the purpose of reducing energy necessary for the operation of the compressor and realizing energy saving, for example.

While the intermittent operation is performed, a period during which the compressor operates and the temperature of the cold storage material falls and a period during which the compressor stops and the temperature of the cold storage material rises are alternately repeated. In this case, since the period during which the cold storage material is cooled is relatively short with the result that the cold storage material is not completely solidified, cold storage in the cold storage mechanism is not sufficiently performed. As a result, the temperature rise of the air blown into the vehicle interior from the air conditioning apparatus cannot be controlled.

Therefore, it is conceivable to increase a cold storage and release performance of the cold storage mechanism. The cold storage and release performance is the degree of heat transfer when the cold storage mechanism exchanges heat with the outside portion, that is, a magnitude of heat conduction or heat transfer between the cold storage mechanism and the outside portion. When the cold storage-and-release performance of the cold storage mechanism is increased, a large amount of heat is taken from the cold storage material within a short period of time during the operation of the compressor. For that reason, even when the intermittent operation as described above is performed, the cold storage material sufficiently lowers the temperature and solidifies. As a result, in a period in which the idle stop is not being performed (i.e. during the intermittent operation), the temperature rise of the air blown into the vehicle interior is controlled.

However, when the engine becomes in the idle stop state, a large amount of heat is added to the cold storage material within a short period of time (because the cold storage and release performance of the cold storage mechanism is high), and all of the cold storage material is melted immediately. For that reason, the temperature of the air blown into the vehicle interior is low immediately after the engine has put into the idle stop state, but the temperature immediately rises.

In this way, it is difficult to control the temperature rise of the air during the intermittent operation of the compressor while controlling the temperature rise of the air after transition to the idle stop state.

The present disclosure has been made in view of the above circumstances, and an object of the present disclosure is to provide an evaporator which is capable of limiting an increase in temperature of air during a period in which a compressor is intermittently operated and capable of limiting an increase in the temperature of the air after transition to an idle stop state.

According to a first aspect of the present disclosure, an evaporator cools air by heat exchange with a refrigerant passing through an inside of the evaporator. The evaporator includes a plurality of cold storage mechanisms each of which lowers a temperature of a cold storage material housed in a cold storage container by heat exchange with the refrigerant. The evaporator includes a first cold storage mechanism that is one of the cold storage mechanisms, and a second cold storage mechanism that is one of the cold storage mechanisms. The second cold storage mechanism is higher in heat storage-and-radiation performance than the first cold storage mechanism.

According to a second aspect of the present disclosure, an evaporator cools air by heat exchange with a refrigerant passing through an inside of the evaporator. The evaporator includes a plurality of tubes through which the refrigerant passes, and a plurality of cold storage mechanisms that are each held between the tubes arranged adjacent to each other and each lower a temperature of the cold storage mechanism by the heat exchange with the refrigerant. The evaporator includes a first cold storage mechanism that is one of the cold storage mechanisms, and a second cold storage mechanism that is one of the cold storage mechanisms. The second cold storage mechanism is higher in heat storage-and-radiation performance than the first cold storage mechanism.

According to a third aspect of the present disclosure, an evaporator cools air by heat exchange with a refrigerant passing through an inside of the evaporator. The evaporator includes a plurality of cold storage mechanisms each of which lowers a temperature of a cold storage material housed in a cold storage container by the heat exchange with the refrigerant. The plurality of cold storage mechanisms include a first cold storage mechanism and a second cold storage mechanism that is higher in heat storage-and-radiation performance than the first cold storage mechanism.

According to a fourth aspect of the present disclosure, an evaporator cools air by heat exchange with a refrigerant passing through an inside of the evaporator. The evaporator includes a plurality of tubes through which the refrigerant passes, and a plurality of cold storage mechanisms that are each held between the tubes arranged adjacent to each other and each lower a temperature of the cold storage mechanism by the heat exchange with the refrigerant. The plurality of cold storage mechanisms include a first cold storage mechanism, and a second cold storage mechanism that is higher in heat storage-and-radiation performance than the first cold storage mechanism.

In the first cold storage mechanism having a relatively low heat storage-and-radiation performance, after transition to the idle stop state, the temperature of the solidified cold storage material slowly rises. In other words, a state in which the cold storage material is at a low temperature is maintained for a long time. For that reason, an increase in the temperature of the air after transition to the idle stop state can be limited over a long period of time.

In the second cold storage mechanism having a relatively high heat storage-and-radiation performance, the temperature of the cold storage material lowers in a short period of time during which the compressor operates during the intermittent operation of the compressor. For that reason, since at least the second cold storage mechanism performs sufficient cold storage, the increase in the temperature of the air blown into the vehicle interior is limited.

As described above, according to the present disclosure, with the provision of the multiple cold storage containers different in the cold storage and release performance from each other, both limiting of the increase in the temperature of the air during the intermittent operation of the compressor and limiting of the increase in the temperature of the air after transition to the idle stop state can be realized.

The present disclosure provides an evaporator capable of limiting an increase in the temperature of the air during the intermittent operation of the compressor and capable of limiting an increase in the temperature of the air after transition to the idle stop state.

BRIEF DESCRIPTION OF THE DRAWINGS

FIG. 5 is a graph showing a change in a blowing temperature and the operation of a compressor in an evaporator according to a comparative example of the present disclosure.

DESCRIPTION OF EMBODIMENTS

Figure 1:
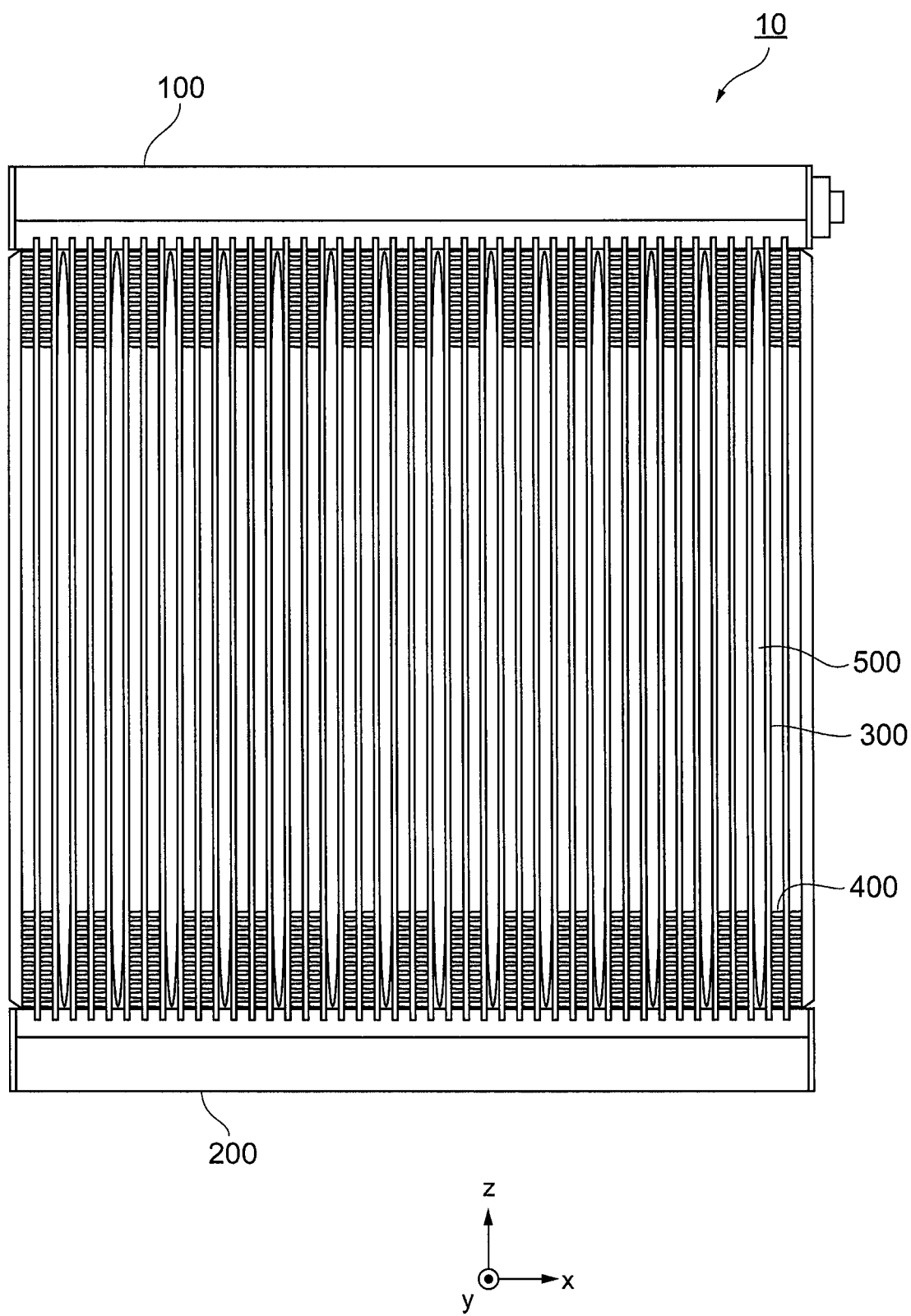
FIG. 1 is a diagram showing an appearance of an evaporator according to a first embodiment of the present disclosure.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the present disclosure will be described with reference to FIGS. 1 to 5. An evaporator 10 shown in FIG. 1 is an evaporator (evaporator) forming a part of a refrigeration cycle (not shown) configured as a vehicle air conditioning system. Refrigerant is sent to the evaporator 10 by a compressor not shown disposed in a part of the refrigeration cycle. The compressor operates by a driving force of an internal combustion engine installed in a vehicle. The evaporator 10 performs heat exchange between a refrigerant and air while internally evaporating a fed refrigerant, to thereby cool the air.

A configuration of the evaporator 10 will be described with reference to FIG. 1. The evaporator 10 includes an upper tank 100, a lower tank 200, tubes 300, corrugated fins 400, and cold storage mechanisms 500.

The upper tank 100 is a container for temporarily storing the refrigerant supplied to the evaporator 10 and supplying the refrigerant to the tubes 300. The upper tank 100 is formed as an elongated rod-like container. The upper tank 100 is disposed in an upper side portion of the evaporator 10 in a state where a longitudinal direction of the upper tank 100 matches a horizontal direction.

The lower tank 200 is a container having substantially the same shape as that of the upper tank 100. The lower tank 200 is configured to receive the refrigerant that has passed through the tubes 300 from the upper tank 100. As with the upper tank 100, the lower tank 200 is disposed in a lower side portion of the evaporator 10 in a state where a longitudinal direction of the lower tank 200 is aligned along the horizontal direction.

Each of the tubes 300 is an elongated pipe having a flattened cross section, and the multiple tubes 300 are disposed in the evaporator 10. Multiple flow channels 301 (not shown in FIG. 1) are provided in the tubes 300 along a longitudinal direction of the tubes 300. The tubes 300 have the longitudinal direction aligned along the vertical direction and are stacked on each other in a state in which main surfaces of the tubes 300 face each other. A direction in which the stacked tubes 300 are aligned is the same as the longitudinal direction of the upper tank 100.

One end of each tube 300 is connected to the upper tank 100, and the other end of the tube 300 is connected to the lower tank 200. With such a configuration, an internal space of the upper tank 100 and an internal space of the lower tank 200 communicate with each other through the flow channels 301 in each tube 300.

The refrigerant passes through the interior of the tubes 300 and moves from the upper tank 100 to the lower tank 200. In this situation, the refrigerant performs heat exchange with the air passing through the evaporator 10, whereby the refrigerant changes from a liquid phase to a gas phase. Also, the air is deprived of heat by the heat exchange with the refrigerant, to thereby lower a temperature of the air.

The corrugated fins 400 are formed by bending a metal plate in a wavy shape. The corrugated fins 400 have a metal plate having a corrugated shape. The corrugated fins 400 are disposed between the respective tubes 300. Tops of each corrugated fin 400 having the wavy shape abut against an outer surface of the tube 300 and are brazed to the outer surface. For that reason, the heat of the air passing through the evaporator 10 is not only transmitted to the refrigerant through the tubes 300, but also transmitted to the refrigerant through the corrugated fins 400 and the tubes 300. In other words, a contact area with the air is increased by the corrugated fins 400, and the heat exchange between the refrigerant and the air is efficiently performed.

The corrugated fins 400 are disposed over an entire space provided between the two adjacent tubes 300 (excluding portions in which the cold storage mechanisms 500 to be described later are disposed), that is, over an entire area extending from the upper tank 100 to the lower tank 200. However, in FIG. 1, only a part of the entire area is shown, and the other parts are omitted from the drawing.

The internal space of the upper tank 100 and the internal space of the lower tank 200 may be divided into multiple parts by partition plates, and the refrigerant may flow (in two opposite directions) while reciprocating between the upper tank 100 and the lower tank 200. In practicing the present disclosure, the path through which the refrigerant passes is not particularly limited.

In FIG. 1, an x-axis is set with the longitudinal direction of the upper tank 100 and the direction from the left side to the right side in FIG. 1 as an x-direction. Further, a y-axis is set with a direction in which air passes through the evaporator 10 and a direction from a back side to a front side in FIG. 1 as a y-direction. Further, a z-axis is set with a direction from the lower tank 200 to the upper tank 100 as a z-direction. Also, in the following drawings, the x-axis, the y-axis, and the z-axis are set in the same manner.

Each of the cold storage mechanisms 500 stores cold while the refrigerant is circulating, and keeps the tubes 300 and the like at a low temperature even after the circulation of the refrigerant has been stopped. Each cold storage mechanism 500 is formed as an elongated bar-like member. The cold storage mechanism 500 is disposed at a position between two adjacent tubes 300 in a state where a longitudinal direction of the cold storage mechanism 500 is aligned along the z-direction, and is held by the respective tubes 300.

As shown in FIG. 1, the corrugated fins 400 are disposed in parts of multiple spaces provided between the tube 300 and the tube 300, and the cold storage mechanisms 500 are disposed in the other parts. In the present embodiment, the corrugated fins 400 and the cold storage mechanisms 500 are arranged regularly from the left side in the order of the corrugated fin 400, the corrugated fin 400, and the cold storage mechanism 500. However, in implementing the present disclosure, a relative positional relationship between the corrugated fins 400 and the cold storage mechanisms 500 and the presence or absence of regularity in the arrangements of those components are not particularly limited.

Figure 2:
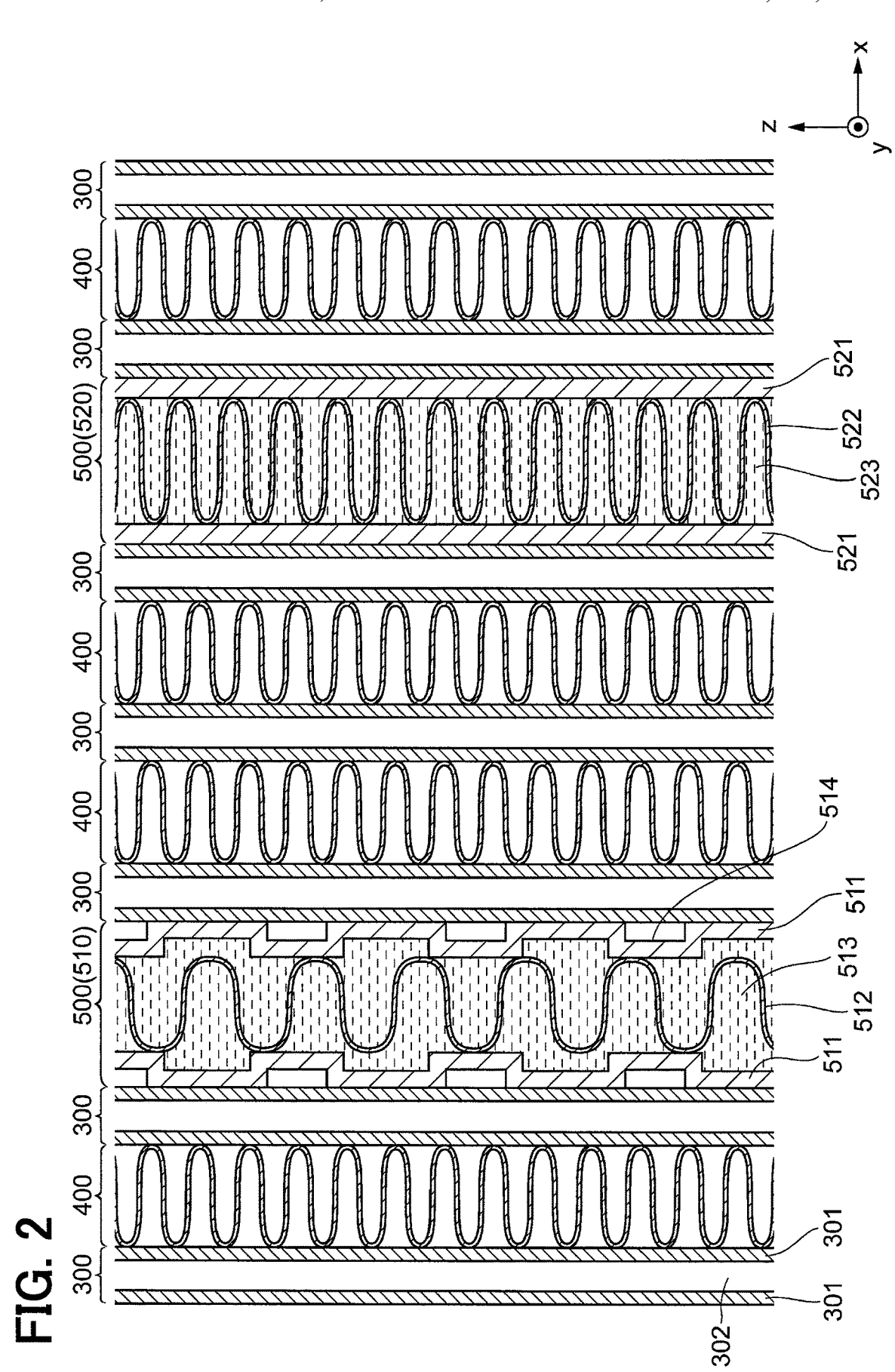
FIG. 2 is a cross-sectional view schematically showing an internal structure of the evaporator according to the first embodiment.

A specific configuration of the cold storage mechanisms 500 will be described with reference to FIG. 2. FIG. 2 shows an internal structure of the cold storage mechanism and the like. The cold storage mechanisms 500 are each provided for lowering the temperature of the cold storage mechanism 500 by heat exchange with the refrigerant and maintaining a low temperature state. In the present embodiment, not all the cold storage mechanisms 500 have the same configuration, but there are two kinds of cold storage mechanisms 500 different in configuration from each other. In order to distinguish those different cold storage mechanisms 500 from each other, in the following description, one type of the cold storage mechanisms 500 is also referred to as "first cold storage mechanisms 510", and the other type of the cold storage mechanisms 500 is also referred to as "second cold storage mechanisms 520".

First, a configuration of the first cold storage mechanisms 510 will be described. Each of the first cold storage mechanisms 510 has a structure in which an inner fin 512 and a cold storage material 513 are accommodated and sealed inside a cold storage container 511.

The cold storage container 511 is a container made of a metal. In the cold storage container 511, multiple concave portions 514 retreating inward are provided. Portions of an outer surface of the cold storage container 511 other than the concave portions 514 abut against the tube 300. For that reason, when a low-temperature refrigerant passes through the flow channel 301 of the tube 300, the first cold storage mechanism 510 is also cooled by heat exchange with the refrigerant.

As with the corrugated fins 400, the inner fin 512 is formed by bending a metal plate (aluminum) into a wavy shape. The apexes of the corrugated inner fin 512 abut against and brazed to the inner wall surface of the cold storage container 511, more specifically, the inner wall surface of the concave portions 514.

The cold storage material 513 is a liquid containing paraffin as a main component, and is filled in the cold storage container 511. That is, a space surrounding the inner fin 512 is filled with the cold storage material 513, and the cold storage material 513 is in contact with both of the inner wall surface of the cold storage container 511 and the surface of the inner fin 512.

When the cold storage container 511 is cooled by the tubes 300, the heat of the cold storage material 513 is transmitted to the tubes 300 through the cold storage container 511. In addition, the heat of the cold storage material 513 is transmitted to the tubes 300 through the inner fin 512 and the cold storage container 511. For that reason, when the refrigerant is circulating in the refrigeration cycle, the cold storage material 513 is efficiently cooled by heat exchange with the refrigerant to lower the temperature, and at least a part of the cold storage material 513 is put into a solidified state. In this manner, the inner fin 512 functions as a heat transfer enhancing material for enhancing heat transfer between the refrigerant and the cold storage material.

When the vehicle transitions to the idle stop state, the compressor of the refrigeration cycle is stopped. For that reason, the refrigerant is not circulated in the refrigeration cycle, and evaporation of the refrigerant in the evaporator 10 is also stopped.

However, since the cold storage material 513 at that time is in a solidified state, all of the cold storage container 511, and the tubes 300 and the corrugated fins 400 which are disposed in the vicinity of the cold storage container 511 are maintained at a low temperature. For that reason, even though the circulation of the refrigerant is stopped, the air passing through the evaporator 10 is cooled. In this manner, with the placement of the first cold storage mechanism 510, the evaporator 10 can maintain the cooling performance for a while even after transition to the idle stop state.

Subsequently, a configuration of the second cold storage mechanism 520 will be described. The second cold storage mechanism 520 is configured such that an inner fin 522 and a cold storage material 523 are accommodated and sealed inside a cold storage container 521. In this manner, the configuration of the second cold storage mechanism 520 is substantially the same as that of the first cold storage mechanism 510 described above.

The cold storage container 521 is a container made of a metal. Unlike the cold storage container 511 of the first cold storage mechanism 510, no concave portion is provided in the cold storage container 521, and the substantially entire surface and inner wall surface of the cold storage container 521 are flat. In portions where the cold storage container 521 and the tube 300 face each other, the entire outer surface of the cold storage container 521 abuts against the tube 300. For that reason, a contact area between the cold storage container 521 and the tube 300 is larger than a contact area between the cold storage container 511 and the tube 300.

As a result, the cold storage and release performance of the second cold storage mechanism 520 is higher than the cold storage and release performance of the first cold storage mechanism 510. When cooled by the tube 300, a larger amount of heat can be taken from the second cold storage mechanism 520 than the first cold storage mechanism 510. Therefore, a time required for the cold storage material 523 of the second cold storage mechanism 520 to solidify is shorter than a time required for the cold storage material 513 of the first cold storage mechanism 510 to solidify.

Like the corrugated fins 400 and the inner fin 512, the inner fin 522 is formed by bending a metal plate (aluminum) into a wavy shape. The respective apexes of the inner fin 522 which are wavy abut against and brazed to an inner wall surface of the cold storage container 521.

As shown in FIG. 2, a pitch of the inner fin 522 (a distance between adjacent apexes) is smaller than a pitch of the inner fin 512. For that reason, a contact area between the inner fin 522 and the cold storage material 523 is larger than a contact area between the inner fin 512 and the cold storage material 513. Since a thermal resistance between the cold storage material 523 and the cold storage container 521 is smaller than a thermal resistance between the cold storage material 513 and the cold storage container 511, the cold storage and release performance of the second cold storage mechanism 520 is higher.

The cold storage material 523 is a liquid containing paraffin as a main component, and is filled in the cold storage container 521. A space surrounding the inner fin 522 is filled with the cold storage material 523, and the cold storage material 523 is in contact with both of the inner wall surface of the cold storage container 521 and the surface of the inner fin 522. In the present embodiment, the cold storage material 513 and the cold storage material 523 are identical with each other.

The second cold storage mechanism 520 configured as described above also functions substantially in the same manner as the first cold storage mechanism 510 described above. In other words, with the execution of the cold storage in the second cold storage mechanism 520, the evaporator 10 can maintain the cooling performance for a while even after transition to the idle stop state.

Figure 3:
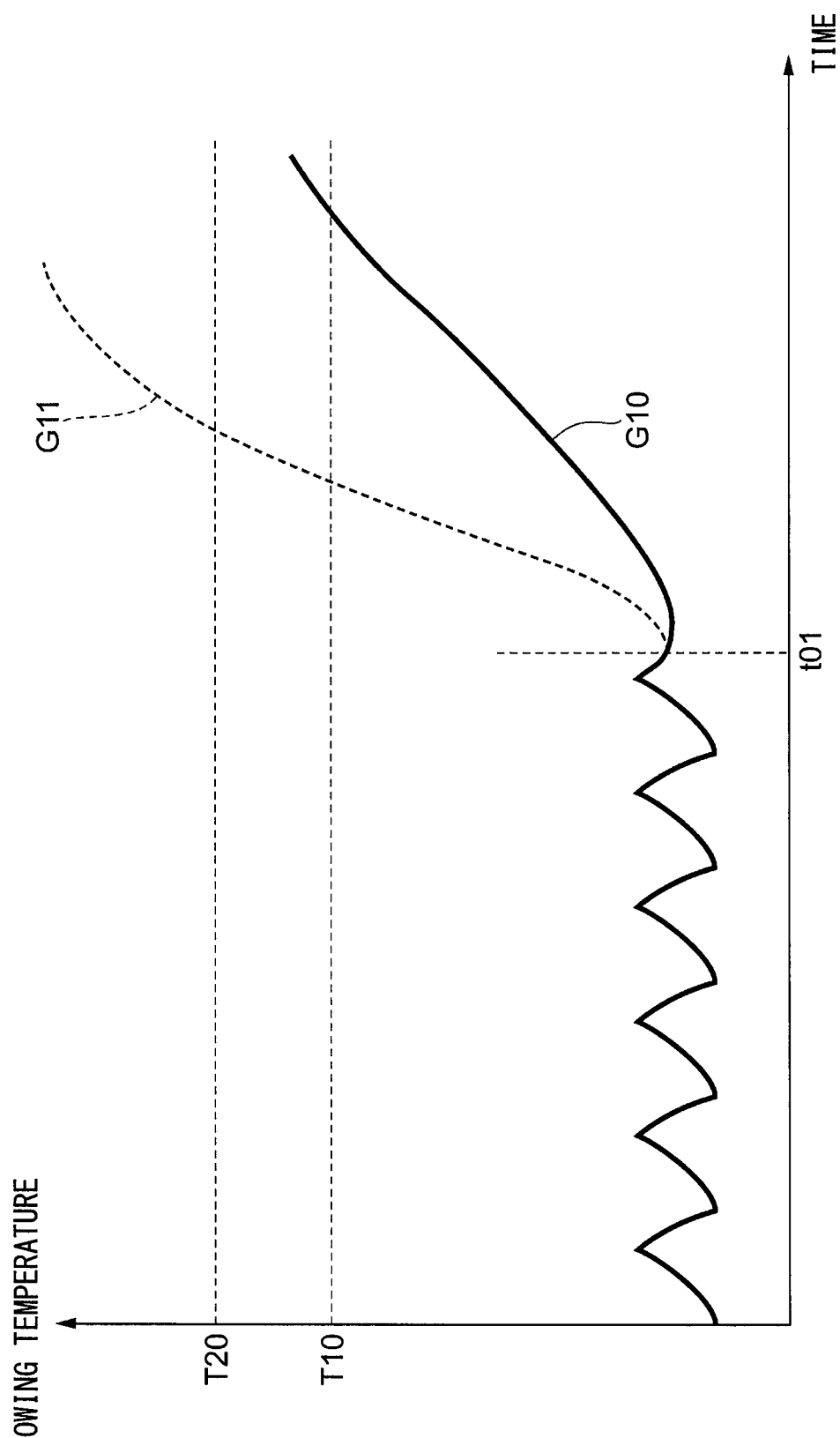
FIG. 3 is a graph showing a change in a blowing temperature when transitioning to an idle stop state in the evaporator according to the first embodiment.
Figure 4:
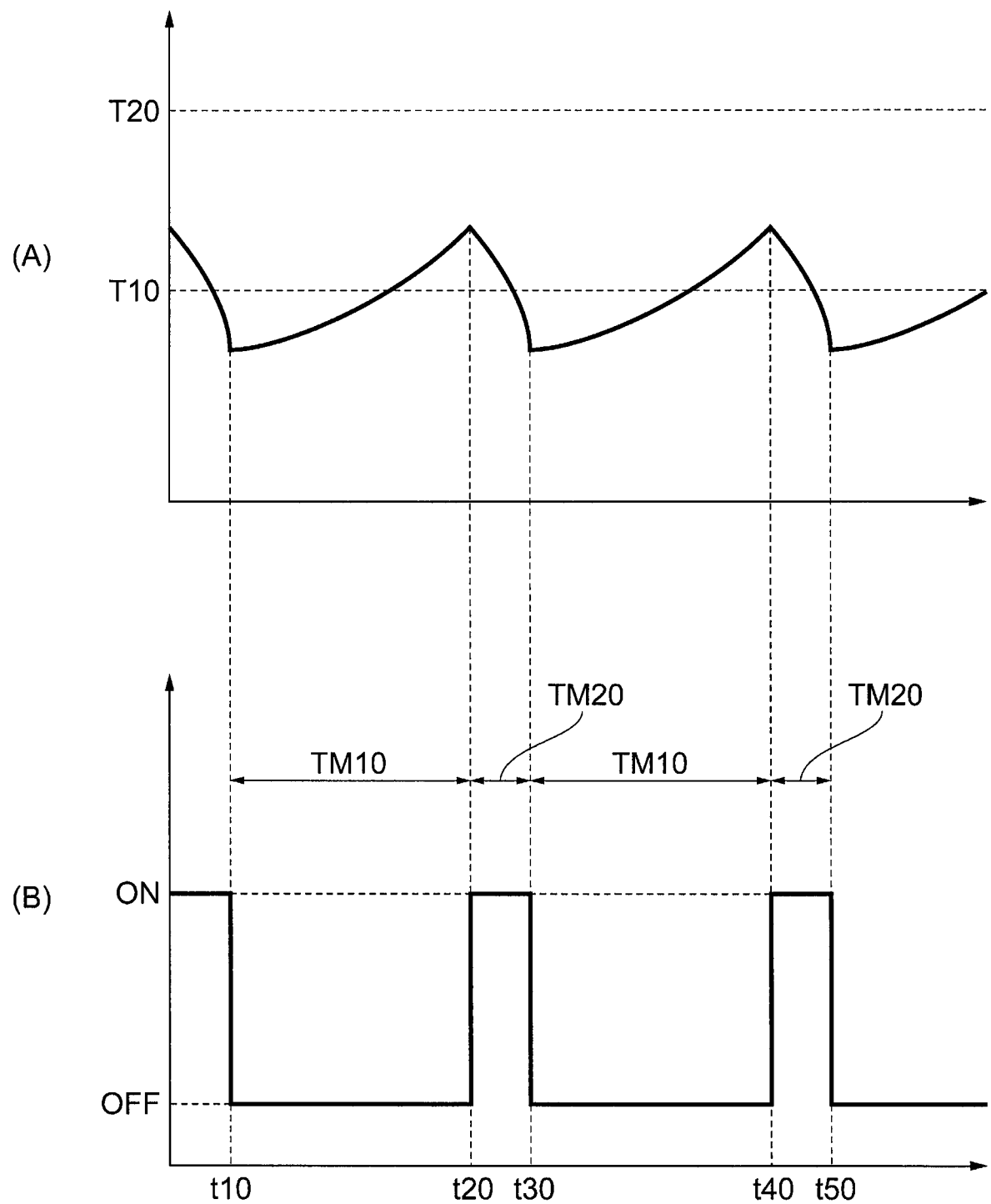
FIG. 4 is a graph showing a change in the blowing temperature and the operation of a compressor in the evaporator according to the first embodiment.

A line G10 in FIG. 3 is a graph showing a change in the temperature (hereinafter also referred to as "blowing temperature") of the air blown into the vehicle interior when the vehicle has transitioned to the idle stop state. In a period before a time t01 at which the idle stop state occurs, the operation of the compressor is performed, and the blowing temperature is kept substantially constant while pulsating.

A temperature T10 indicated in FIG. 3 is a melting point of the cold storage material 513 and the cold storage material 523. In the period before time t01, the temperature of the refrigerant and the blowing temperature are sufficiently lower than the temperature T10. For that reason, the cold storage material 513 and the cold storage material 523 cooled by the refrigerant are both in a solidified state. Although varying depending on an overall size of the evaporator 10, a time required from the driving of the compressor to a state in which the cold storage material 513 and the like are solidified is about 60 seconds.

After the time t01, the idle stop state is established, and therefore the circulation of the refrigerant is not performed. As a result, the temperature of the refrigerant and the blowing temperature gradually rise. A temperature T20 indicated in FIG. 3 is an upper limit value of the blowing temperature necessary for maintaining a temperature inside the vehicle interior comfortable. When the blowing temperature becomes equal to or higher than the temperature T20, the idle stop is interrupted and the internal combustion engine is automatically driven.

A line G11 in FIG. 3 indicates a change in the blowing temperature in the case where the cold storage mechanism 500 does not exist. In the present embodiment (line G10), the cold storage mechanism 500 keeps the tubes 300 and the corrugated fins 400 at a low temperature. For that reason, as compared with the case where the cold storage mechanism 500 does not exist (line G11), a rate of the temperature rise after the time t01 is gentle. Since a period from the transition to the idle stop state to a time when the blowing temperature exceeds the temperature T20 becomes long (about 60 seconds), the temperature in the vehicle interior can be kept comfortable while the state of the idle stop is continued for a long time.

In the air conditioning apparatus equipped with the evaporator 10, operation is also performed to reduce the consumption of energy by setting the blowing temperature to be relatively high. Such operation is also referred to as "energy saving mode operation" below.

In the energy saving mode operation, the intermittent operation of the compressor is performed, whereby the blowing temperature is set to be higher than usual. The energy saving mode operation is performed, for example, by turning on/off the compressor based on a measured temperature by a thermistor so that the blowing temperature falls within a fixed range.

FIG. 4A is a graph showing a change in the blowing temperature when the energy saving mode operation is performed. FIG. 4B is a graph showing a change in the operation (driving state) of the compressor at this time. In the example shown in FIGS. 4A and 4B, the blowing temperature fluctuates across the temperature T10 (the melting point of the cold storage material 513 and the like).

In this example, as shown in FIG. 4B, the compressor is stopped in a period TM10 from a time t10 to a time t20, and the compressor operation is performed in a period TM20 from the time t20 to a time t30. Thereafter, the period TM10 and the period TM20 are alternately repeated.

The period TM 20 during which the compressor is driven with the result of which the circulation of the refrigerant is performed is a relatively short period. Since the cold storage mechanism 500 is cooled only for a short period of time, it seems that the period TM 20 ends before the cold storage material 513 and the like solidify. However, in the present embodiment, as described above, since the cold storage and release performance of the second cold storage mechanism 520 is enhanced, at least the cold storage material 523 of the second cold storage mechanism 520 solidifies during the period TM20.

In other words, in the second cold storage mechanism 520, cold storage is efficiently performed in the period TM20. In a subsequent period TM10, the compressor is stopped, but a rising speed of the blowing temperature is gentle due to the effect of cold storage. As a result, a length of the period TM10 until the compressor is driven next is relatively long.

FIGS. 5A and 5B show graphs of an evaporator (comparative example with the present embodiment) that is equipped with no cold storage mechanism 500. FIG. 5A is a graph showing a change in the blowing temperature when the energy saving mode operation is performed. FIG. 5B is a graph showing a change in the operation (driving state) of the compressor at this time.

In the example of FIGS. 5A and 5B, intermittent operation of the compressor is also performed. Specifically, the compressor is stopped in a period TM11 from a time t11 to a time t21, and the compressor is operated in a period TM21 from the time t21 to a time t31. Thereafter, the period TM11 and the period TM21 are alternately repeated.

In the above comparative example, since there is no cold storage mechanism, cold storage is not performed in the period TM 21. Therefore, after the time (t31, etc.) at which the compressor stops, the blowing temperature rises quickly. As a result, the period TM11 is shorter than the period TM10 of FIGS. 4A and 4B, and the compressor is frequently driven. As apparent from the comparison between FIGS. 4A, 4B and FIGS. 5A, 5B, in the present embodiment, with the provision of the cold storage mechanism 500 (particularly the second cold storage mechanism 520), the driving frequency of the compressor is reduced and energy saving is realized.

When the evaporator 10 includes no second cold storage mechanism 520 and all of the cold storage mechanisms 500 are the first cold storage mechanisms 510, a change in the blowing temperature during the energy saving mode operation is the same as that shown in FIG. 5A. This is because the first cold storage mechanism 510 is low in the cold storage and release performance and the refrigerant does not solidify in a short period of time as in the period TM 21 (that is, efficient cold storage is not performed).

As described above, in the present embodiment, with the provision of the second cold storage mechanism 520 as a part of the cold storage mechanisms 500, an increase in the blowing temperature in the energy saving mode operation is reduced, and the driving frequency of the compressor is reduced.

In view of the above, it seems that all of the cold storage mechanisms 500 are preferably configured by the second cold storage mechanisms 520. However, when no first cold storage mechanism 510 is provided, the cold storage materials 523 solidified inside the second cold storage mechanisms 520 melt completely in a short period of time after transition to the idle stop state. In other words, due to the high cold storage and release performance of all the cold storage mechanisms 500, a period during which the cold storage material 523 is in a solidified state becomes short. As a result, the period during which the cooling performance of the evaporator 10 is maintained during the idle stop is shortened.

As described above, in the present embodiment, with the provision of both of the first cold storage mechanism 510 and the second cold storage mechanism 520, which are different in the cold storage and release performance from each other, both of the control of an increase in the blowing temperature during the intermittent operation of the compressor (FIGS. 4A and 4B) and the control of an increase in the blowing temperature after transition to the idle stop state (FIG. 3) are realized.

Second Embodiment

Figure 6:
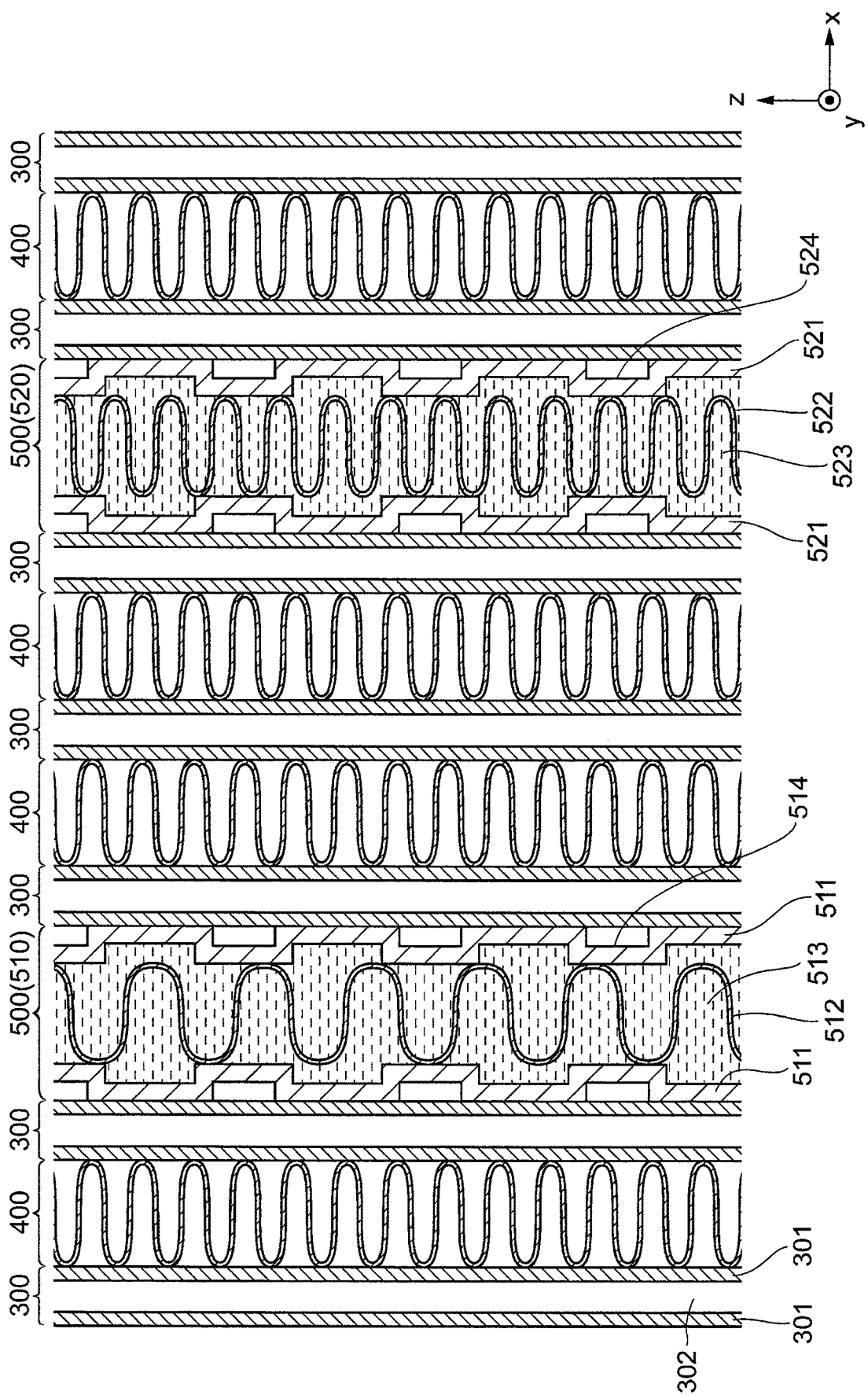
FIG. 6 is a diagram schematically showing an internal structure of an evaporator according to a second embodiment of the present disclosure.

Hereinafter, a second embodiment of the present disclosure will be described with reference to FIG. 6. The second embodiment is different in only a configuration of a second cold storage mechanism 520 from the first embodiment, and the other configurations are identical with those in the first embodiment. FIG. 6 shows an internal structure of a cold storage material and the like.

In the present embodiment, a shape of a cold storage container 521 is the same as the shape of a cold storage container 511. In the cold storage container 521, multiple concave portions 524 retreating inward are provided. Portions of an outer surface of the cold storage container 521 other than the concave portions 524 abut against tubes 300.

In the inside of the cold storage container 521, the apexes of wavy inner fin 522 abut against and brazed to the inner wall surface of the cold storage container 521, more specifically, the inner wall surface of the concave portions 524. A pitch of the inner fin 522 is the same as the pitch of the inner fin 522 in the first embodiment (FIG. 2). In other words, the pitch of the inner fin 522 is smaller than the pitch of an inner fin 512. Likewise, in the present embodiment, a cold storage material 513 and a cold storage material 523 are identical with each other.

In this manner, in a first cold storage mechanism 510 and the second cold storage mechanism 520, only the pitches of the respective inner fins are set to be different from each other, thereby relatively enhancing the cold storage and release performance of the second cold storage mechanism 520. As a result, the same advantages as those of the first embodiment can be obtained.

Figure 7:
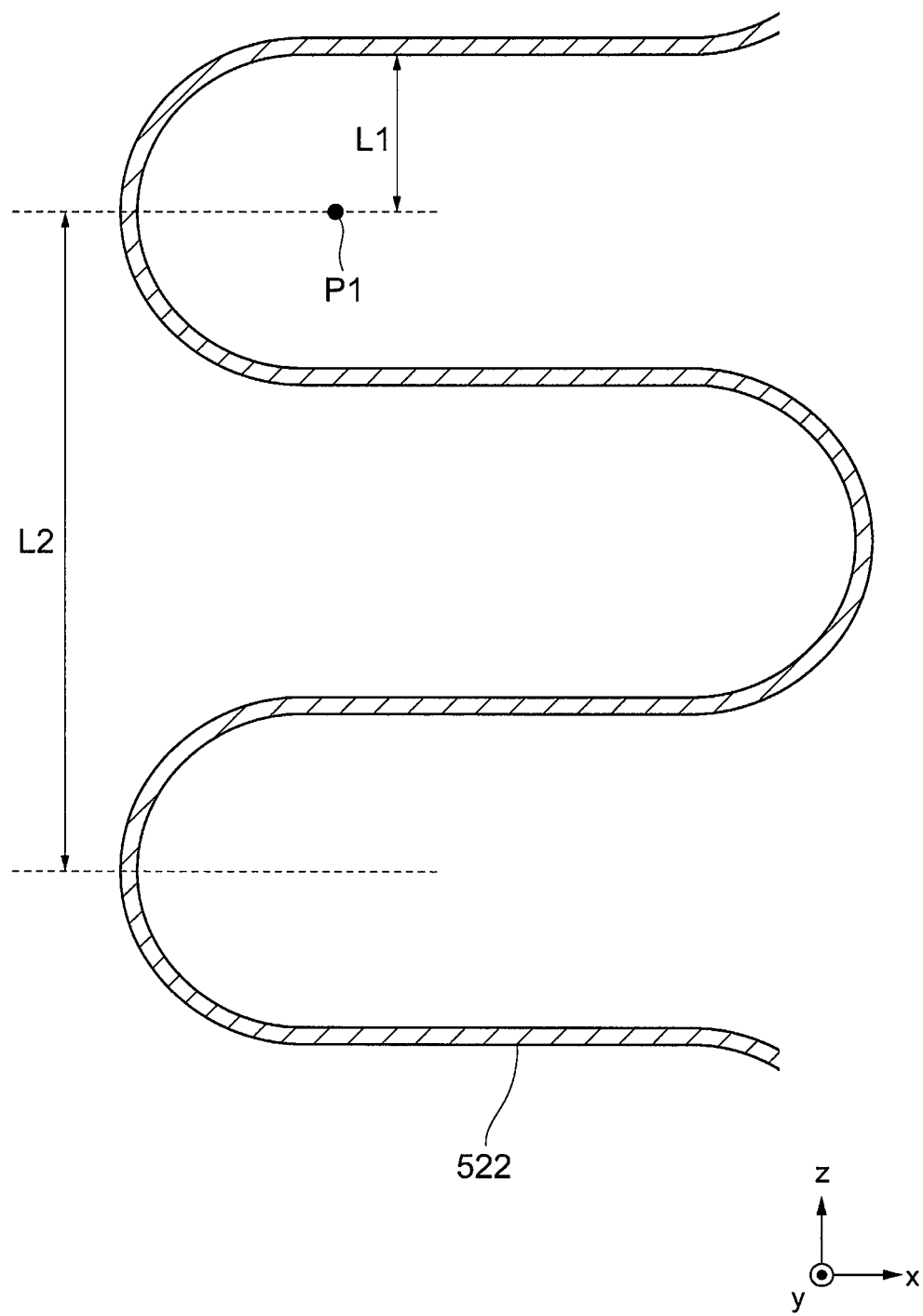
FIG. 7 is a diagram illustrating a shape of an inner fin in a cold storage mechanism according to the second embodiment.

The reasons why the cold storage and release performance of the second cold storage mechanism 520 is increased when the pitch of the inner fin 522 is set to be small are that a contact area between the inner fin 522 and the cold storage material 523 is increased, and a phase change distance in the interior of the cold storage container 521 is reduced. The "phase change distance" means a distance between a point (for example, a point P1 in FIG. 7) of the cold storage material 523 most distant from the surface of the inner fin 522 (heat transfer enhancing material) and the surface of the inner fin 522 (distance L1 in FIG. 7). The phase change distance of the first cold storage mechanism 510 is also defined similarly.

Figure 8:
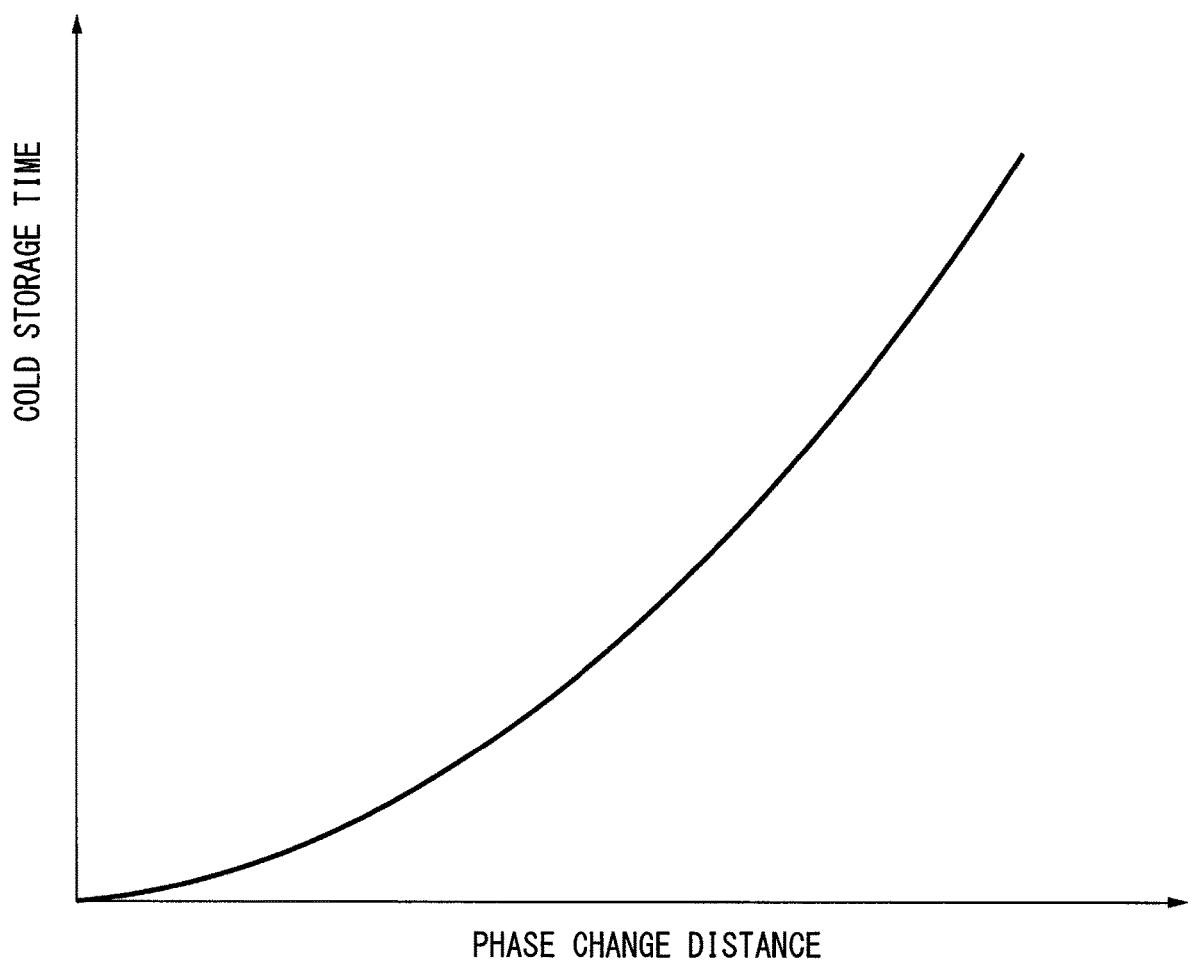
FIG. 8 is a graph showing a relationship between a phase change distance and a cold storage time according to the present disclosure.

When such a phase change distance is small, the cold storage and release performance of the second cold storage mechanism 520 is further increased, and the cold storage material 523 is solidified in a shorter time. FIG. 8 shows a relationship between the phase change distance and a cold storage time. The "cold storage time" is a time required from the start of cooling by the tubes 300 until solidification of the cold storage material 523. As shown in FIG. 8, the smaller the phase change distance becomes, the shorter the cold storage time becomes. When a graph is drawn with the horizontal axis as the pitch of the inner fin 522, the same graph as that shown in FIG. 8 is obtained.

In practicing the present disclosure, it is desirable that the phase change distance in the first cold storage mechanism 510 is set to a range of 0.4 mm to 0.75 mm and the phase change distance in the second cold storage mechanism 520 is set to be 0.4 mm or less. It is also desirable that the pitch of the inner fin 512 in the first cold storage mechanism 510 is set to a range of 1.5 mm to 3 mm and the pitch of the inner fin 522 in the second cold storage mechanism 520 is set to be 1.5 mm or less.

The thickness of the inner fin 522 may be larger than the thickness of the inner fin 512. In this case, since the heat conduction inside the inner fin 522 is increased, the cold storage and release performance of the second cold storage mechanism 520 is relatively increased.

Further, the inner fin 522 may be made of a material (for example, carbon) that is higher in a thermal conductivity than the material (aluminum) of the inner fin 512. Also in this case, since the heat conduction of the inner fin 522 per se becomes large, the cold storage and release performance of the second cold storage mechanism 520 is relatively increased.

Third Embodiment

Figure 9:
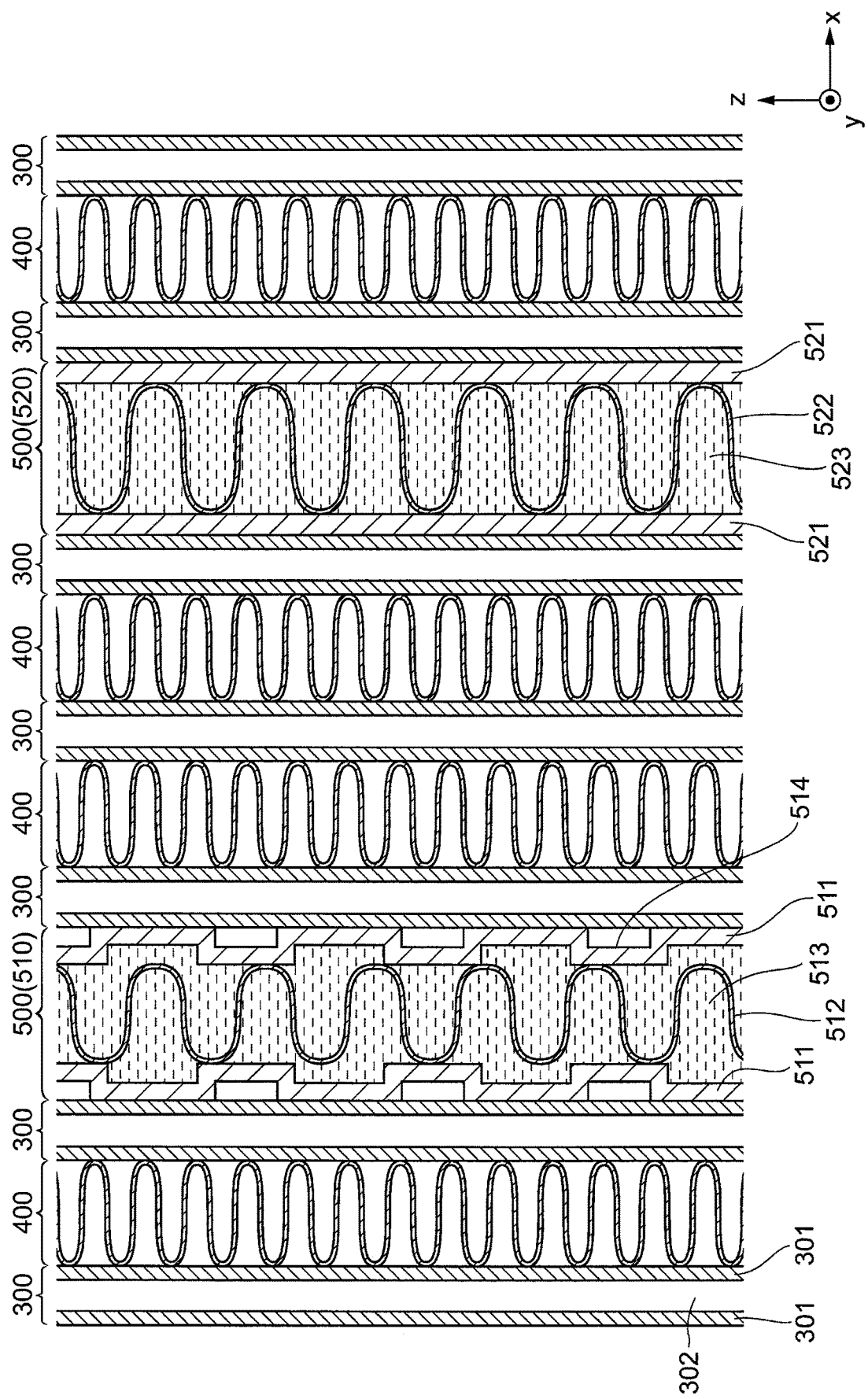
FIG. 9 is a diagram schematically showing an internal structure of an evaporator according to a third embodiment of the present disclosure.

Hereinafter, a third embodiment of the present disclosure will be described with reference to FIG. 9. Similarly, the third embodiment is different in only a configuration of a second cold storage mechanism 520 from the first embodiment, and the other configurations are identical with those in the first embodiment. FIG. 9 shows an internal structure of a cold storage material and the like.

In the present embodiment, a pitch of an inner fin 522 in the second cold storage mechanism 520 is the same as the pitch of an inner fin 512 in a first cold storage mechanism 510. In other words, the second cold storage mechanism 520 is different from the first cold storage mechanism 510 only in a contact area between a cold storage container 521 and a tube 300. Even in such a configuration, the same advantages as those in the first embodiment are obtained.

As a specific configuration for setting the contact area between the cold storage container 521 and the tube 300 to be larger than the contact area between a cold storage container 511 and the tube 300, as in the present embodiment, the shape of the cold storage container 521 may be changed. Alternatively, the shape of the tube 300 in contact with the cold storage container 521 may be changed.

Fourth Embodiment

Figure 10:
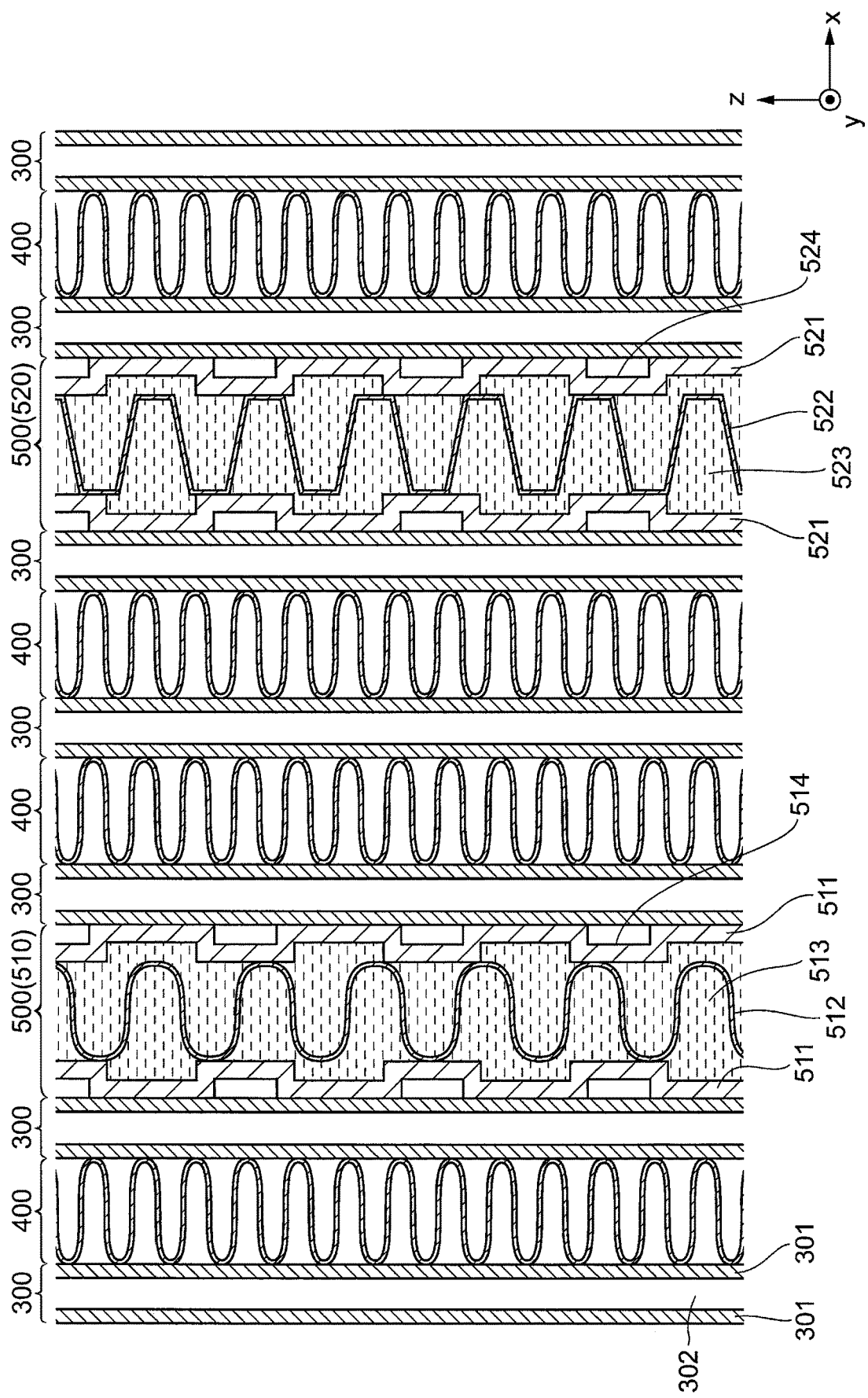
FIG. 10 is a diagram schematically showing an internal structure of an evaporator according to a fourth embodiment of the present disclosure.

Hereinafter, a fourth embodiment of the present disclosure will be described with reference to FIG. 10. Similarly, the fourth embodiment is different in only a configuration of a second cold storage mechanism 520 from the first embodiment, and the other configurations are identical with those in the first embodiment. FIG. 10 shows an internal structure of a cold storage material and the like.

In the present embodiment, a shape of a cold storage container 521 is the same as the shape (FIG. 6) of the cold storage container 521 in the second embodiment. In other words, in the cold storage container 521, multiple concave portions 524 retreating inward are provided. Portions of an outer surface of the cold storage container 521 other than the concave portions 524 abut against tubes 300.

The respective apexes of an inner fin 522 accommodated in the cold storage container 521 are flat, and each wavy shape when viewed along a y-axis is trapezoidal. The flat surfaces of the apexes abut against and brazed to an inner wall surface of the cold storage container 521, more specifically, inner wall surfaces of the concave portions 524.

For that reason, a contact area between the cold storage container 521 and the inner fin 522 (heat transfer enhancing material) in the second cold storage mechanism 520 is larger than a contact area between a cold storage container 511 and an inner fin 512 in a first cold storage mechanism 510. As a result, the heat storage-and-radiation performance of the second cold storage mechanism 520 is relatively increased. Even in such a configuration, the same advantages as those in the first embodiment are obtained.

As a specific configuration for setting the contact area between the cold storage container 521 and the inner fin 522 to be larger than the contact area between the cold storage container 511 and the inner fin 512, as in the present embodiment, the shape of the inner fin 522 may be changed. Alternatively, the shape of the cold storage container 521 in contact with the inner fin 522 may be changed.

In the above example, the shape and the like of the cold storage container 521 and the inner fin 522 are changed in order to set the cold storage and release performance of the second cold storage mechanism 520 to be higher than the cold storage and release performance of the first cold storage mechanism 510. Instead of such a mode, the material of a cold storage material 523 may be changed.

Figure 11A:
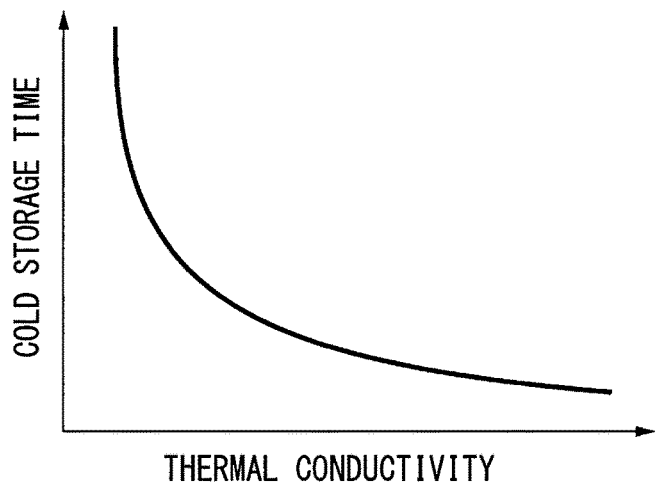
FIG. 11A is a graph showing a relationship between a thermal conductivity of a cold storage material and a cold storage time according to the present disclosure.

For example, with the use of a material having a thermal conductivity higher than the thermal conductivity of a cold storage material 513 as the cold storage material 523, the cold storage and release performance of the second cold storage mechanism 520 may be relatively increased. As shown in FIG. 11A, the cold storage and release performance becomes higher as the thermal conductivity of the cold storage material 523 is higher, as a result of which the cold storage time becomes shorter.

In order to increase the thermal conductivity of the cold storage material 523, for example, carbon nanotubes may be added to the same paraffin as the cold storage material 513. Paraffin having a thermal conductivity higher than that of paraffin of the cold storage material 513 may be used as the cold storage material 523. In implementing the present disclosure, it is desirable that the thermal conductivity of the cold storage material 513 in the first cold storage mechanism 510 is set within a range of 0.1 W/mK to 0.6 W/mK, and the thermal conduction of the cold storage material 523 in the second cold storage mechanism 520 is set to be 0.6 W/mK or more.

The physical property values that are made different between the cold storage material 513 and the cold storage material 523 may not be the thermal conductivity as described above but may be other physical property values. Such physical property values include, for example, a melting point, a latent heat, and so on.

Figure 11B:
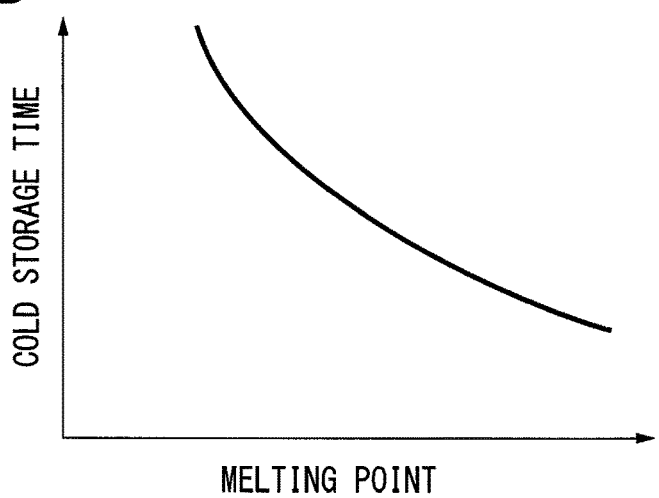
FIG. 11B is a graph showing a relationship between a melting point of a cold storage material and the cold storage time according to the present disclosure.
Figure 11C:
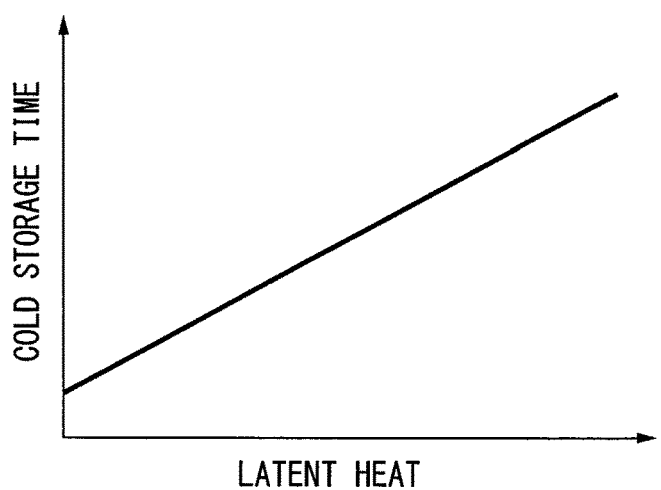
FIG. 11C is a graph showing a relationship between a latent heat of a cold storage material and the cold storage time according to the present disclosure.

As shown in FIG. 11B, the cold storage and release performance of the second cold storage mechanism 520 becomes higher as the melting point of the cold storage material 523 is higher, as a result of which the cold storage time becomes shorter. As shown in FIG. 11C, the cold storage and release performance of the second cold storage mechanism 520 becomes higher as a latent heat of the cold storage material 523 is smaller, as a result of which the cold storage time becomes shorter.

The configuration for relatively increasing the cold storage and release performance of the second cold storage mechanism 520 is not limited to those mentioned above, and various configurations may be adopted. For example, irregularities, fins or the like may be provided on the inner wall surface of the cold storage container 521 so that the contact area between the cold storage container 521 and the cold storage material 523 may be set to be larger than the contact area between the cold storage container 511 and the cold storage material 513. Even in the configurations described above, the cold storage and release performance of the second cold storage mechanism 520 can be set to be higher than the cold storage and release performance of the first cold storage mechanism 510.

Fifth Embodiment

Figure 12:
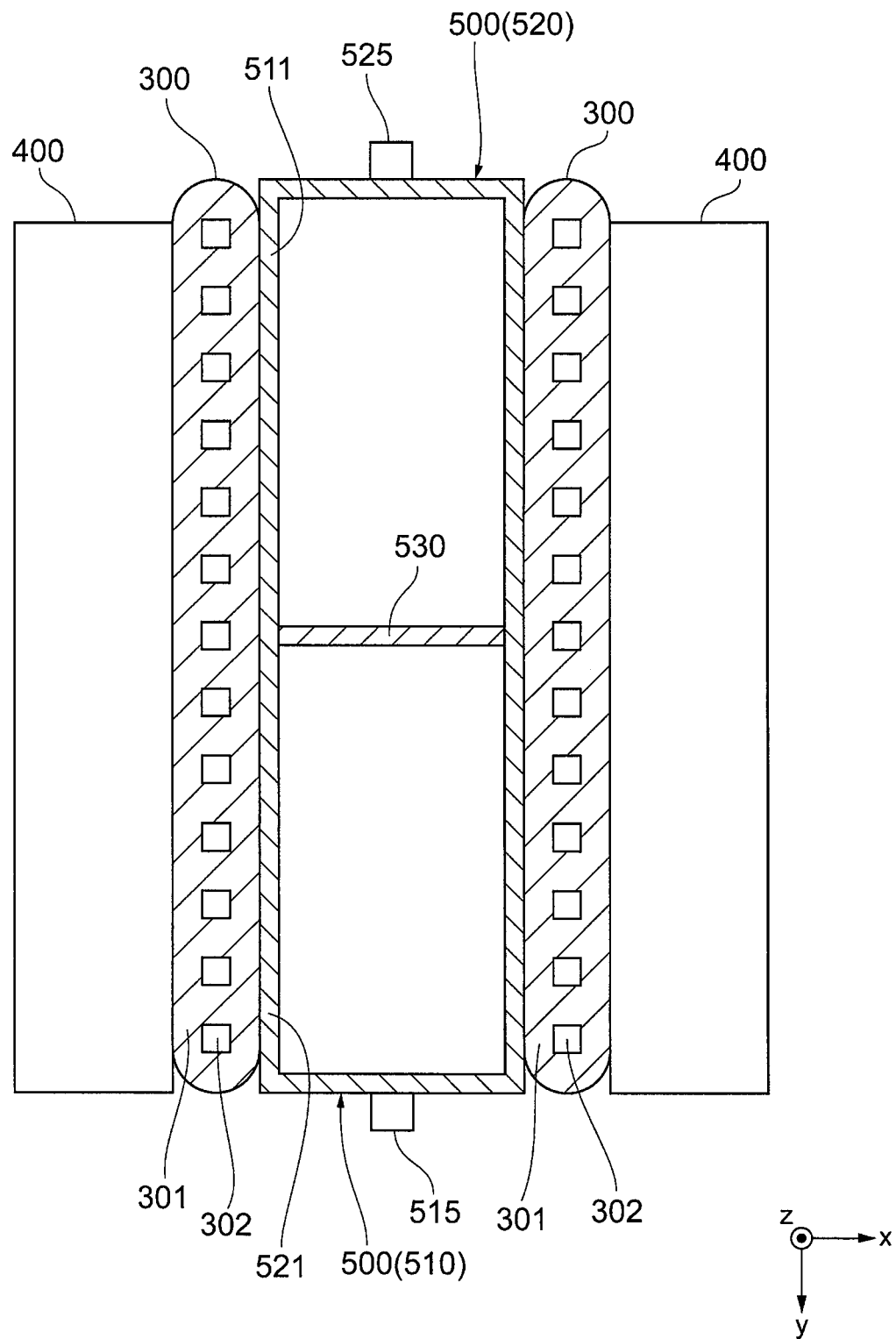
FIG. 12 is a diagram schematically showing a configuration of an evaporator according to a fifth embodiment of the present disclosure.

Hereinafter, a fifth embodiment of the present disclosure will be described with reference to FIGS. 12 and 13. In the fifth embodiment, the shapes and placements of a first cold storage mechanism 510 and a second cold storage mechanism 520 are different from those of the first embodiment. The other configurations are the same as those of the first embodiment.

In the present embodiment, the first cold storage mechanism 510 and the second cold storage mechanism 520 are not disposed alternately along an x-direction as in the examples described above, but are disposed next to each other in a direction in which air passes through an evaporator 10 (y-direction). More specifically, the second cold storage mechanism 520 is disposed on the upstream side in an air passage direction, and the first cold storage mechanism 510 is disposed on the downstream side.

In the present embodiment, a cold storage container 511 of the first cold storage mechanism 510 and a cold storage container 521 of the second cold storage mechanism 520 are not separated from each other, and are overall configured as one container. A partition plate 530 is disposed at a position that is the center along a y-direction in the interior of the container. The internal space of the container is partitioned into two spaces by the partition plate 530. A portion on an −x-direction side of the partition plate is the first cold storage mechanism 510, and a portion on an x-direction side of the partition plate is the second cold storage mechanism 520. In FIG. 12, illustration of inner fins 512 and 522 is omitted.

Figure 13:
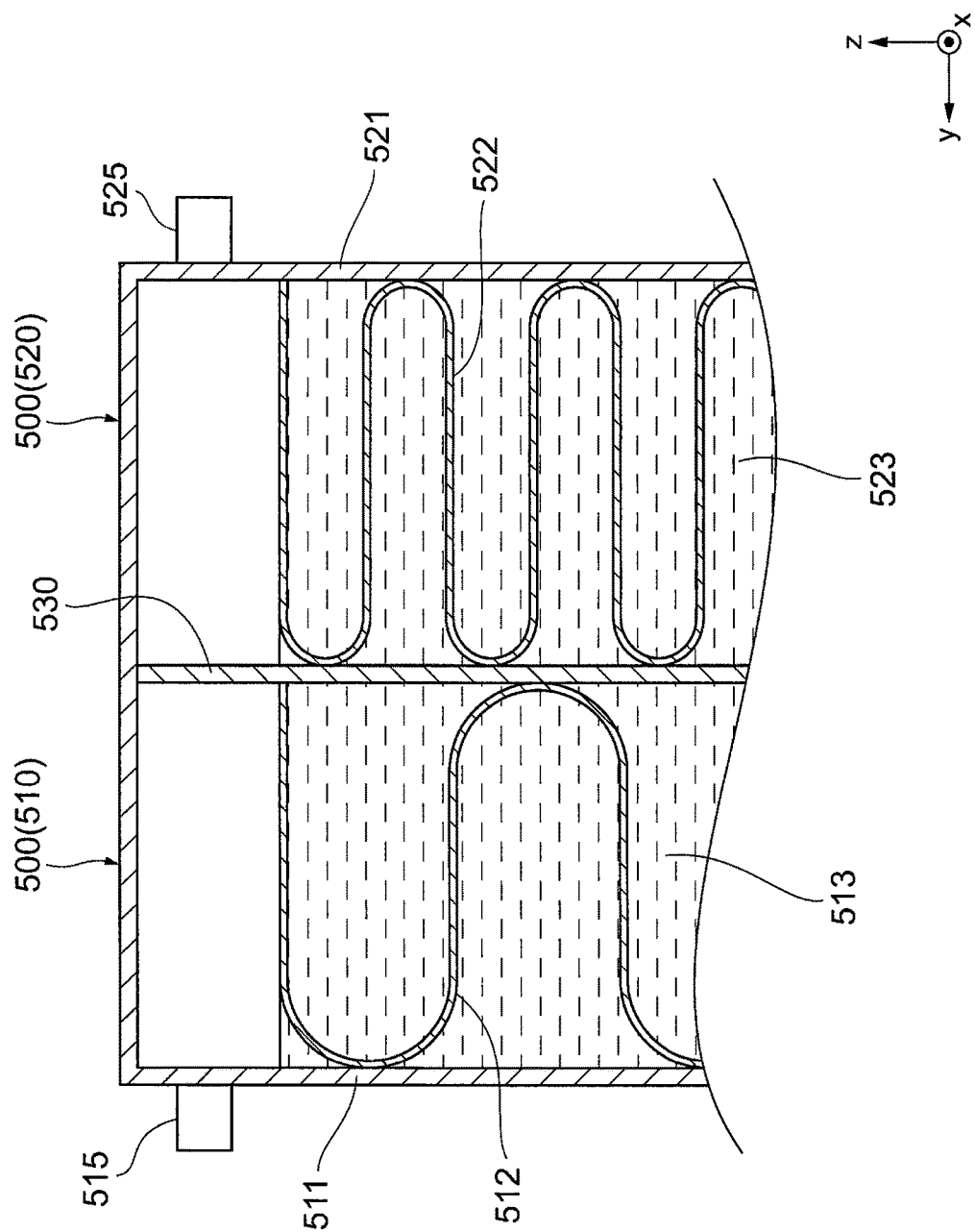
FIG. 13 is a diagram schematically showing the configuration of the evaporator according to the fifth embodiment.

As shown in FIG. 13, a filling portion 515 protruding in the y-direction is formed in the vicinity of an upper end portion of a side surface of the cold storage container 511 on the y-direction side. The filling portion 515 is a portion serving as an inlet of cold storage material 513 when the cold storage container 511 is filled with the cold storage material 513.

Likewise, a filling portion 525 protruding in the −y-direction is formed in the vicinity of an upper end portion of a side surface of the cold storage container 521 on the −y-direction side. The filling portion 525 is a portion serving as an inlet of a cold storage material 523 when the cold storage container 521 is filled with the cold storage material 523.

In the present embodiment, a pressure loss when the refrigerant passes through the evaporator 10 is comparatively large, and a difference between the refrigerant temperature at the upstream side (refrigerant inlet side) along the flow of the refrigerant and the refrigerant temperature on the downstream side (refrigerant outlet side) along the flow of the refrigerant is large. Further, the evaporator 10 is installed so as to place a portion on the refrigerant inlet side where the refrigerant temperature is relatively high on a leeward side (y-direction side) and a portion on the refrigerant outlet side where the refrigerant temperature is relatively low on a windward side (−y-direction side).

Since the second cold storage mechanism 520 that needs to store the cold in a relatively short period of time is arranged on the windward side (−y-direction side) where the refrigerant temperature is low, the cold storage is more efficiently performed in the energy saving mode operation.

In the case where a pressure loss when the refrigerant passes through the evaporator 10 is relatively small, the difference between the refrigerant temperature on the refrigerant inlet side and the refrigerant temperature on the refrigerant outlet side also becomes small. In such a case, the second cold storage mechanism 520 may be disposed on the leeward side (y-direction side) where the air load is low.

In the present embodiment, a pair of the first cold storage mechanism 510 and the second cold storage mechanism 520 are aligned along a direction (y-direction) through which air passes. For that reason, for example, as compared with the case where the first cold storage mechanism 510 and the second cold storage mechanism 520 are aligned along the x-direction as shown in FIG. 2, a ventilation resistance received when the air passes through the evaporator 10 is reduced. As a result, while maintaining the performance of the evaporator 10, a blower that is installed for feeding air can be reduced in size.

As a specific configuration for aligning the first cold storage mechanism 510 and the second cold storage mechanism 520 along the y-direction, various configurations other than the configuration shown in FIG. 13 can be employed.

Figure 14:
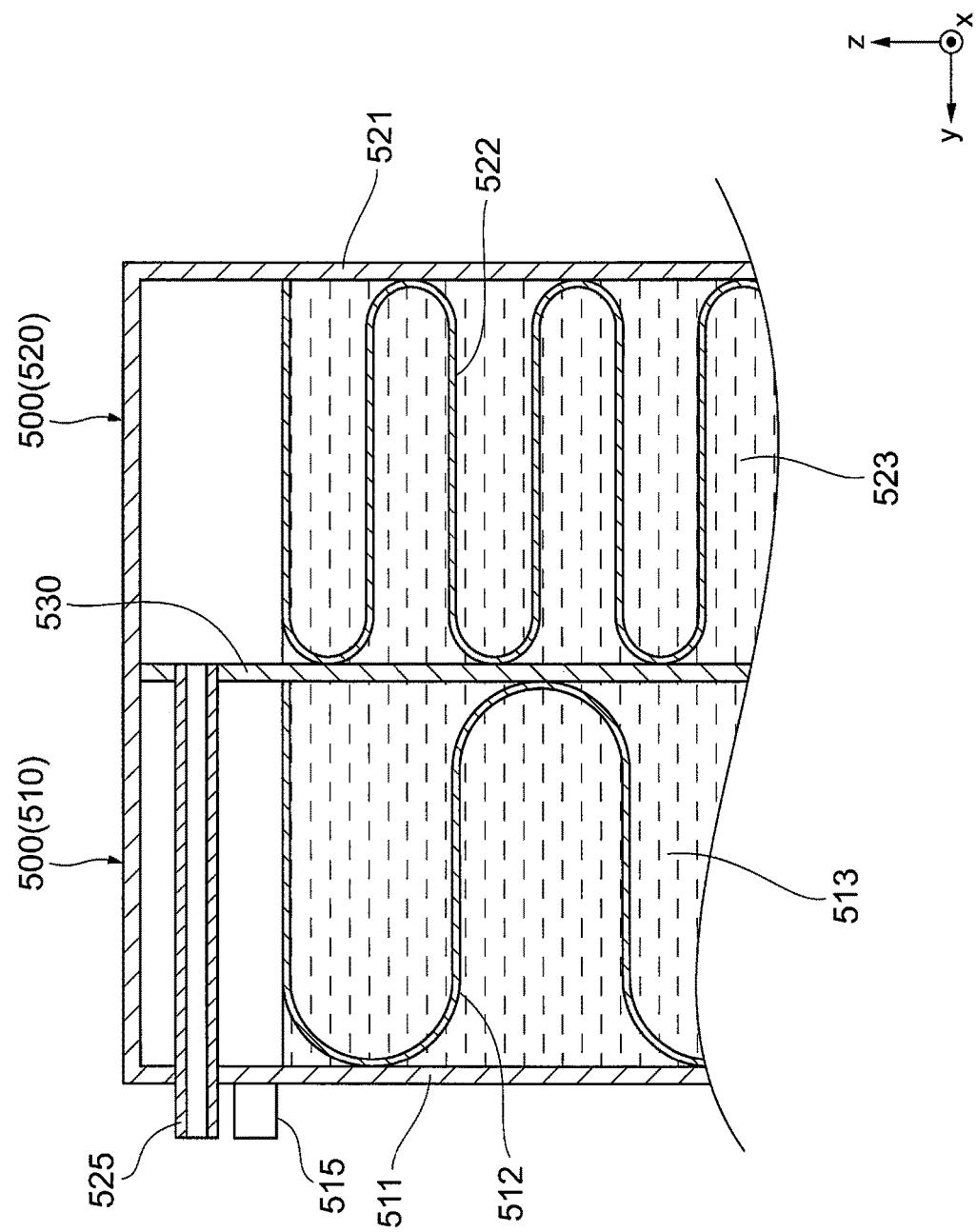
FIG. 14 is a diagram schematically showing a configuration of an evaporator according to one modification of the fifth embodiment.

In an example shown in FIG. 14, the filling portion 525 is configured as a pipe placed so as to penetrate the partition plate 530 and the cold storage container 511. An end portion of the filling portion 525 on the −y-direction side is inserted through a through hole provided in the partition plate 530, and an internal space of the filling portion 525 and an internal space of the cold storage container 521 communicate with each other. Similarly to the filling portion 515, an end portion of the filling portion 525 on the y-direction side protrudes in the y-direction from the side surface of the cold storage container 511 on the y-direction side.

Figure 15:
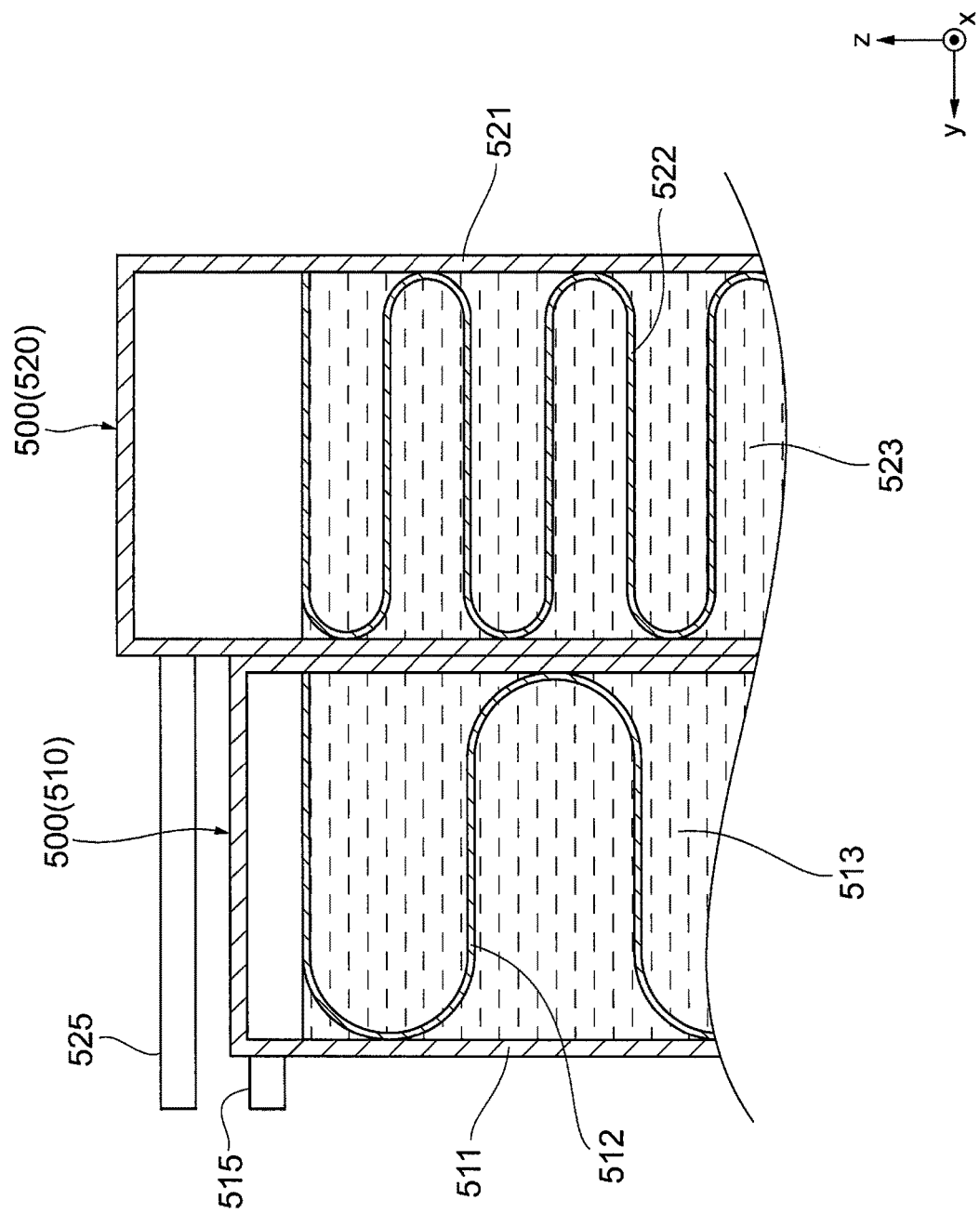
FIG. 15 is a diagram schematically showing a configuration of an evaporator according to another modification of the fifth embodiment.

In an example shown in FIG. 15, no partition plate 530 is present, and the cold storage container 511 and the cold storage container 521 are formed as respective separate containers. In addition, a position of an upper end of the cold storage container 511 is set to be lower than a position of an upper end portion of the cold storage container 521. The filling portion 525 is configured as a pipe similar to the example in FIG. 14, but the whole of the filling portion 525 is placed outside (on the upper side) of the cold storage container 511.

Figure 16:
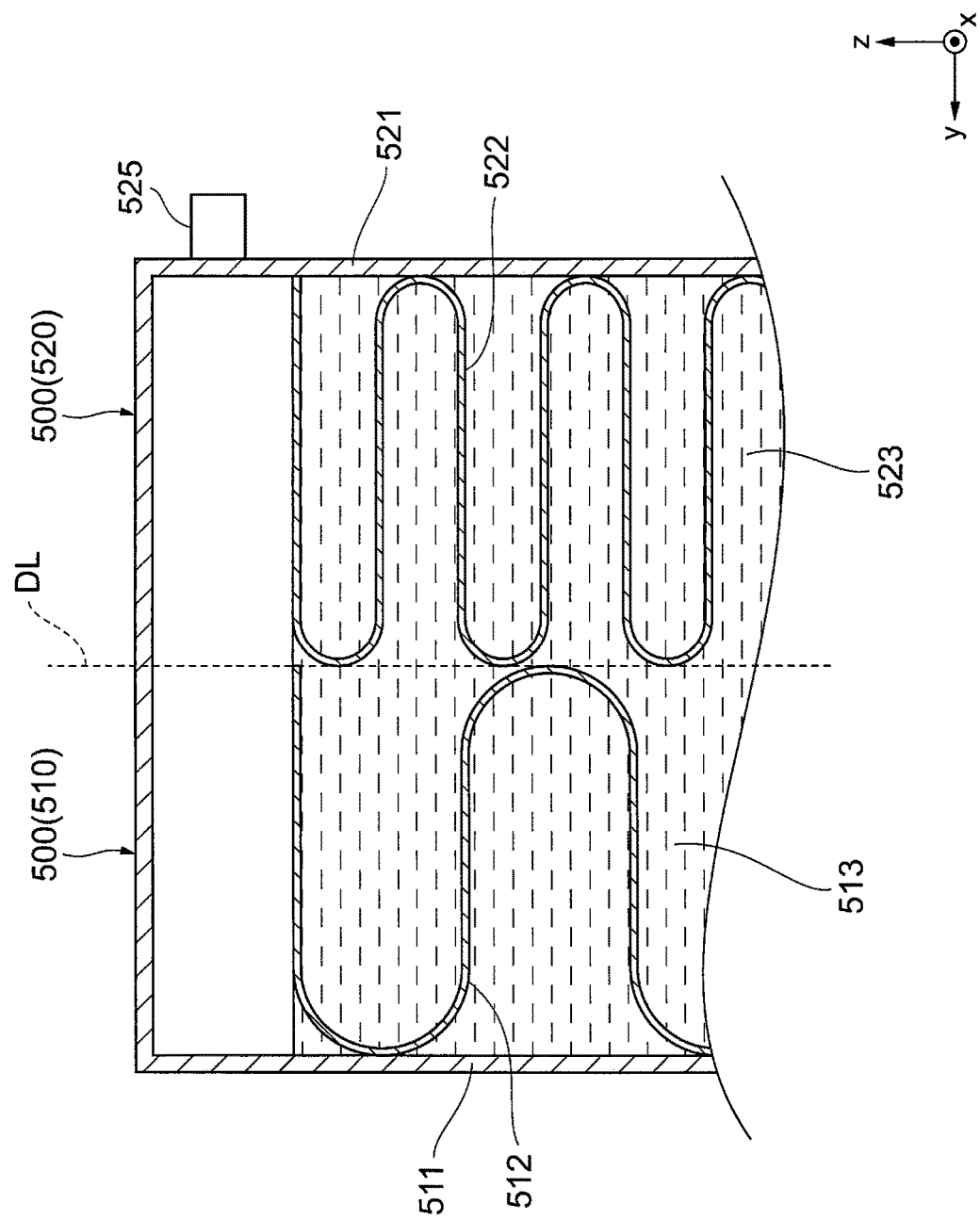
FIG. 16 is a diagram schematically showing a configuration of an evaporator according to another modification of the fifth embodiment.

In an example shown in FIG. 16, no partition plate 530 is present, and the internal space of the cold storage container 511 and the internal space of the cold storage container 521 are not separated from each other. A portion on the y-direction side of a dotted line DL in FIG. 16 forms the first cold storage mechanism 510, and a portion on the −y-direction side of the dotted line DL forms the second cold storage mechanism 520. However, the internal cold storage material (513, 523) is shared by both of the first cold storage mechanism 510 and the second cold storage mechanism 520. In the above configuration, since only one inlet of the cold storage material is sufficient, only the filling portion 525 is provided and the filling portion 515 is not provided.

Figure 17:
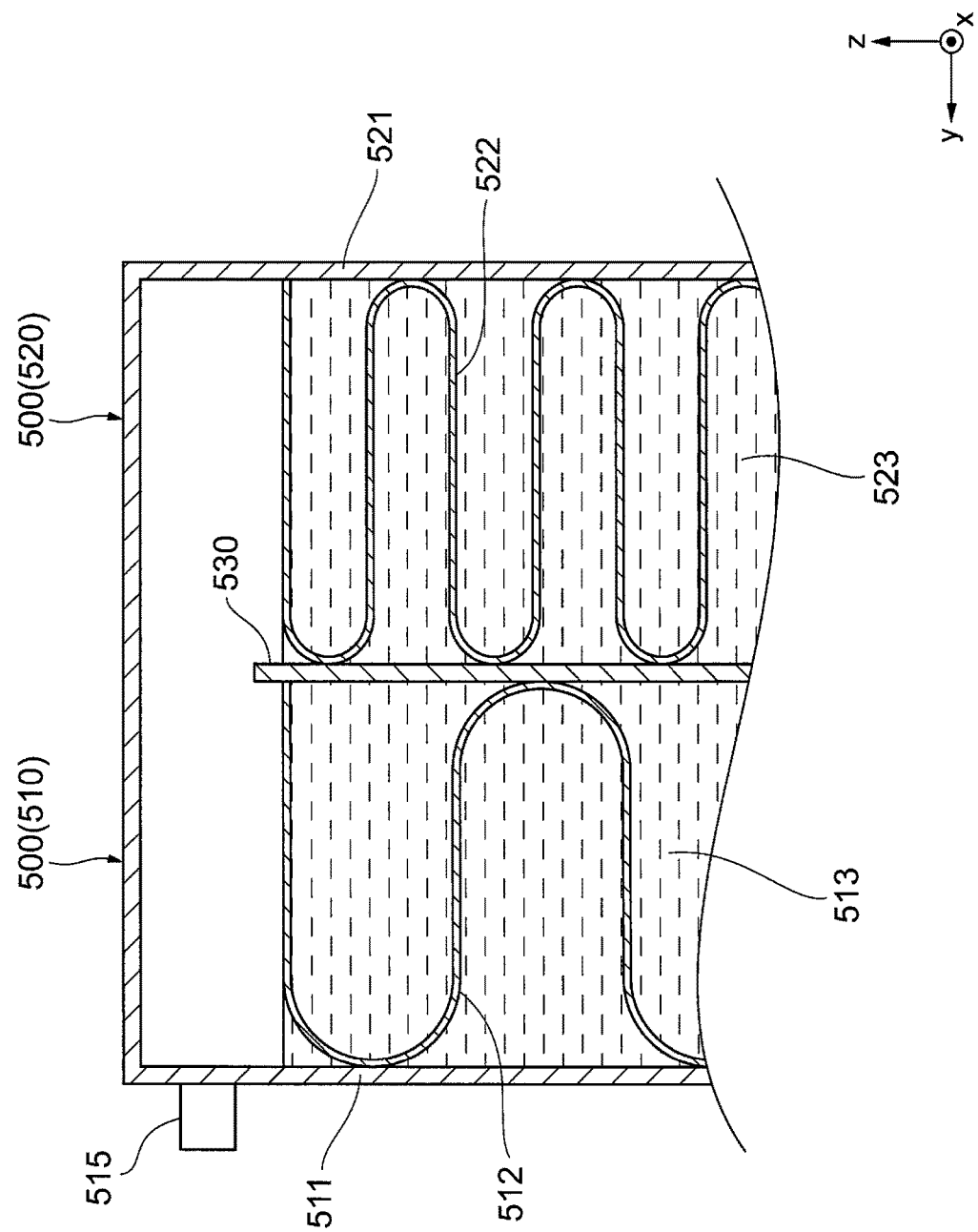
FIG. 17 is a diagram schematically showing a configuration of an evaporator according to another modification of the fifth embodiment.

In an example shown in FIG. 17, an upper end of the partition plate 530 and top plates of the cold storage containers 511 and 521 are separated from each other. The upper end position of the partition plate 530 is located lower than a lower end position of the filling portion 515. In this example, only the filling portion 515 is formed, and the filling portion 525 is not formed. When the cold storage container 521 is filled with the cold storage material 523 made of a material different from that of the cold storage material 513, the cold storage material 523 may be filled from the filling portion 515 with a syringe or the like.

Figure 18:
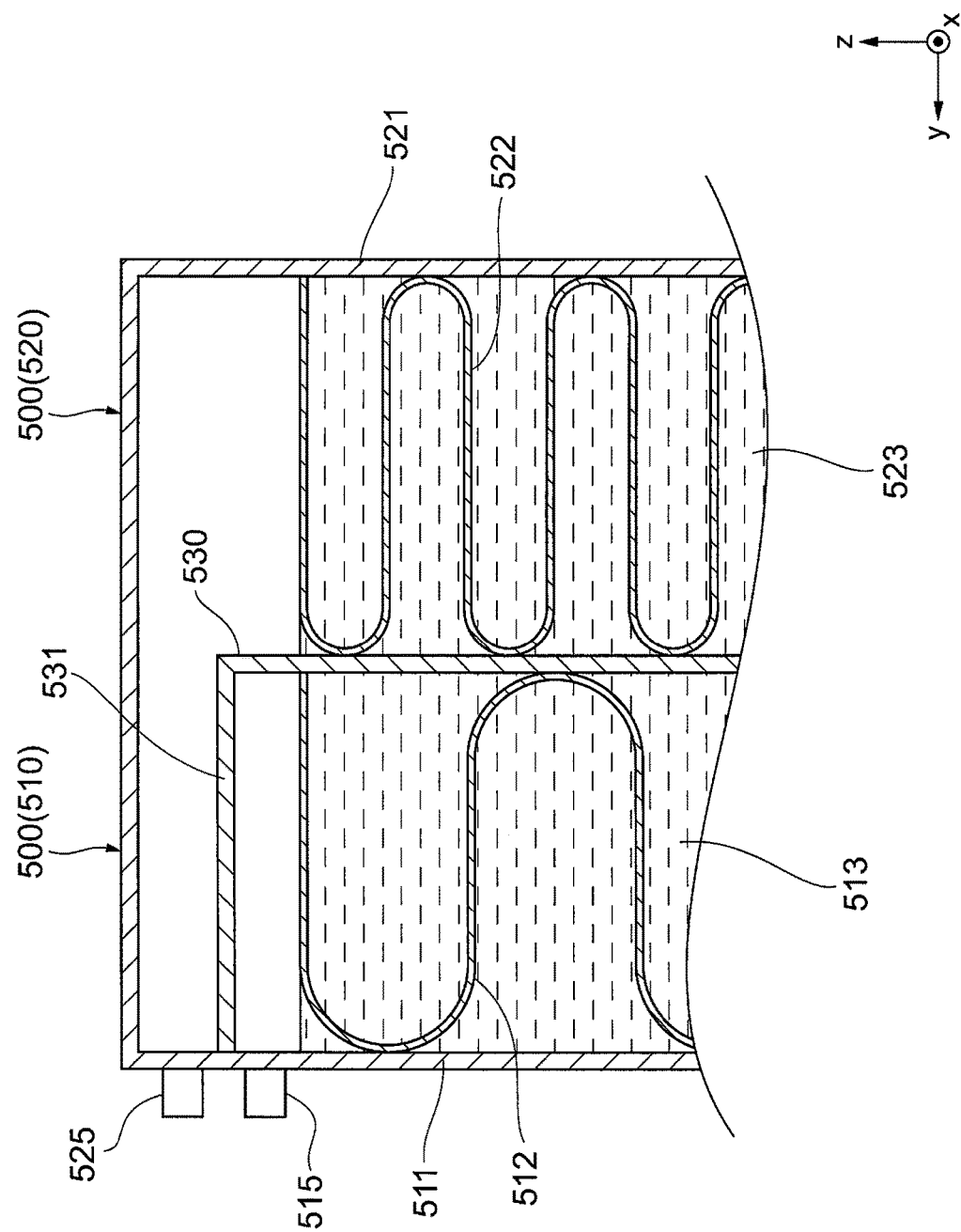
FIG. 18 is a diagram schematically showing a configuration of an evaporator according to another modification of the fifth embodiment.

In an example shown in FIG. 18, as in the example of FIG. 17, an upper end of the partition plate 530 and top plates of the cold storage containers 511 and 521 are separated from each other. In addition, a top plate 531 is formed to extend from an upper end of the partition plate 530 in the y-direction. The internal space of the cold storage container 511 and the internal space of the cold storage container 521 are completely separated from each other by the partition plate 530 and the top plate 531. The filling portion 515 is formed below the top plate 531, and the filling portion 525 is formed above the top plate 531.

Figure 19:
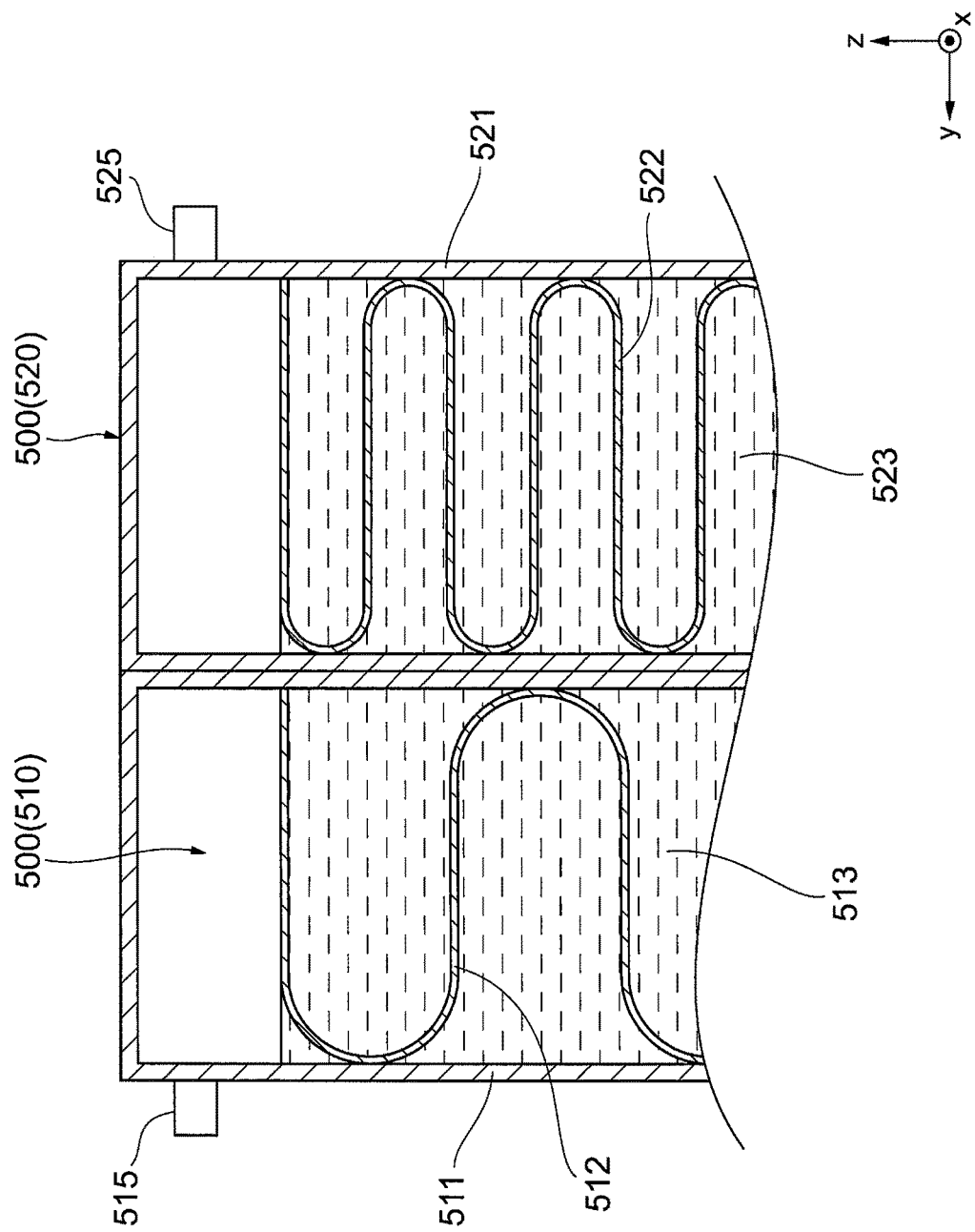
FIG. 19 is a diagram schematically showing a configuration of an evaporator according to another modification of the fifth embodiment.

In an example shown in FIG. 19, as in the example of FIG. 15, no partition plate 530 is present, and the cold storage container 511 and the cold storage container 521 are formed as respective separate containers. In this example, the upper end portion of the cold storage container 511 and the upper end portion of the cold storage container 521 have the same height.

As described above with reference to FIGS. 13 to 19, as a specific configuration for aligning the first cold storage mechanism 510 and the second cold storage mechanism 520 along the y-direction, various configurations other than the configuration shown in FIG. 13 can be employed. When the first cold storage mechanism 510 and the second cold storage mechanism 520 are aligned along the y-direction, a dimension of entire cold storage mechanisms 500 along the y-direction may be larger than a dimension of a tube 300 along the y-direction. In other words, at least one of the first cold storage mechanism 510 and the second cold storage mechanism 520 may protrude outward (toward the −y-direction side or the y-direction side) from the end portion of the tube 300 or the corrugated fin.

Sixth Embodiment

Figure 20:
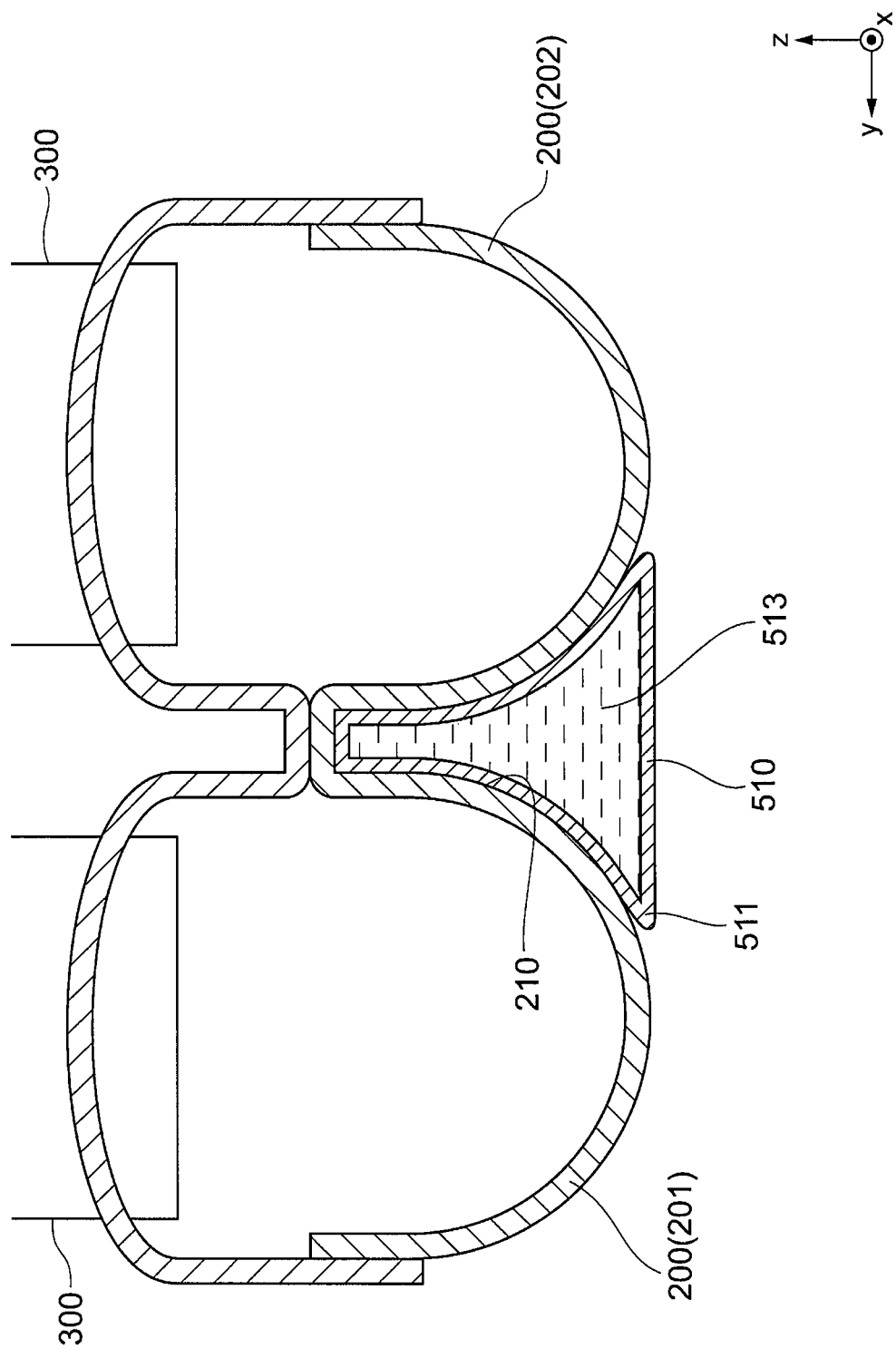
FIG. 20 is a diagram schematically showing a configuration of an evaporator according to a sixth embodiment of the present disclosure.

Hereinafter, a sixth embodiment of the present disclosure will be described with reference to FIG. 20. The second embodiment is different in only the configuration and placement of a first cold storage mechanism 510 from the first embodiment, and the other configurations are identical with those in the first embodiment.

Unlike the previous examples, the first cold storage mechanism 510 in the present embodiment is not disposed in a portion of an evaporator 10 where multiple tubes 300 are disposed, that is, in the core portion. The first cold storage mechanism 510 is disposed at a position adjacent to a lower tank 200 at a position outside (−z-direction side) of the core portion. On the other hand, a second cold storage mechanism 520 in the present embodiment is disposed in the core portion (not shown in FIG. 20) as in the previous examples.

The lower tank 200 in the present embodiment has a configuration in which two tanks (first lower tank 201 and second lower tank 202) having substantially the same shape are arranged next to each other in the y-direction. Each tank is disposed with a longitudinal direction along the x-axis. For that reason, a concave portion 210 along the x-axis is provided between the first lower tank 201 and the second lower tank 202 (and on the lower side). The first cold storage mechanism 510 is accommodated in the concave portion 210.

The outer shape of the first cold storage mechanism 510 (cold storage container 511) has a shape that can be accommodated in the concave portion 210, and is different from the outer shape of the first cold storage mechanism 510 in the first embodiment and the like. However, the feature that the cold storage and release performance is lower than the cold storage and release performance of the second cold storage mechanism 520 is the same as that in the first embodiment and the like In such a configuration, not all of cold storage mechanisms 500 are disposed in the core portion, but a part of the cold storage mechanisms 500 (first cold storage mechanism 510) is disposed outside the core portion. Since the ventilation resistance received when the air passes through the evaporator 10 is reduced, while maintaining the performance of the evaporator 10, a blower that is installed for feeding the air can be reduced in size.

The second cold storage mechanism 520 is disposed in the core portion in the same manner as in the previous examples. Since the core portion is a portion where the cooling (heat transfer) of the second cold storage mechanism 520 is efficiently performed by a flow of the refrigerant, the cold is efficiently stored in the energy saving mode operation.

In addition, the first cold storage mechanism 510 is disposed outside the core portion, but is cooled by the lower tank 200. For that reason, the function of controlling an increase in the blowing temperature after transition to the idle stop state is exerted in the same manner described above.

Seventh Embodiment

A seventh embodiment of the present disclosure will be described with reference to FIG. 21. In the seventh embodiment, the shapes and placements of a first cold storage mechanism 510 and a second cold storage mechanism 520 are different from those of the first embodiment. The other configurations are the same as those of the first embodiment.

In the present embodiment, the first cold storage mechanism 510 and the second cold storage mechanism 520 are aligned next to each other in a vertical direction (z-direction) in a space sandwiched between two adjacent tubes 300 to each other. More specifically, the first cold storage mechanism 510 is disposed on the upstream side, and the second cold storage mechanism 520 is disposed on the downstream side.

The advantages of the case where a cold storage mechanism 500 is disposed in this way will be described with reference to FIGS. 21 and 22. FIG. 22 shows a change in the temperature of each part after a time t100 at which the state transitions to the idle stop state. A line G 20 in FIG. 22 is a graph showing a temporal change in the blowing temperature. A line G21 in FIG. 22 is a graph showing a temporal change in the temperature of a cold storage material 513 in the first cold storage mechanism 510. A line G22 in FIG. 22 is a graph showing a temporal change in the temperature of a cold storage material 523 in the second cold storage mechanism 520.

The temperature (line G21) of the cold storage material 513 gradually rises after the time t100. Since the cold storage and release performance of the first cold storage mechanism 510 is low, the performance of cooling the surrounding tubes 300 and the like is also low. For that reason, immediately after the time t100, the temperature of the cold storage material 513 rises at a relatively high speed with the surrounding temperature rise.

However, the fact that the cold storage and release performance of the first cold storage mechanism 510 is low means that a time required for melting all of the internal cold storage materials 513 is relatively long. For that reason, the cold storage material 513 continues to cool the surroundings for a long time.

The temperature (line G22) of the cold storage material 523 gradually rises after the time t100. However, since the second cold storage mechanism 520 is high in the cold storage and release performance, the performance of cooling the surrounding tubes 300 and the like is also high. For that reason, immediately after the time t100, the cold storage material 523 is kept at a low temperature even if the surrounding temperature rises.

However, the fact that the cold storage and release performance of the second cold storage mechanism 520 is high means that a time required for melting all of the internal cold storage materials 523 is relatively short. Since the cold storage material 513 raises the temperature of the cold storage material 513 in a short time, the time to keep cooling the surroundings is short.

The respective temperatures of the cold storage material 513 and the cold storage material 523 change as described above. For that reason, at a time t200 in which the period after transition to the idle stop is relatively short, the temperature of the cold storage material 523 is lower than the temperature of the cold storage material 513. Also, at a time t300 where the period after transition to the idle stop is relatively long, the temperature of the cold storage material 523 is higher than the temperature of the cold storage material 513.

By the way, when the compressor is stopped in the idle stop state, the refrigerant changes from a liquid phase to a gas phase in the tube 300. At this time, the refrigerant that has transitioned to the gas phase on the lower side of the core portion moves upward in the tube 300. However, when a portion on the upper side is cooled, the refrigerant becomes liquid phase again and moves downward (arrow AR1 in FIG. 21). As a result, since the liquid phase refrigerant continues to exist over a long period of time, an increase in the blowing temperature is controlled.

Figure 21:
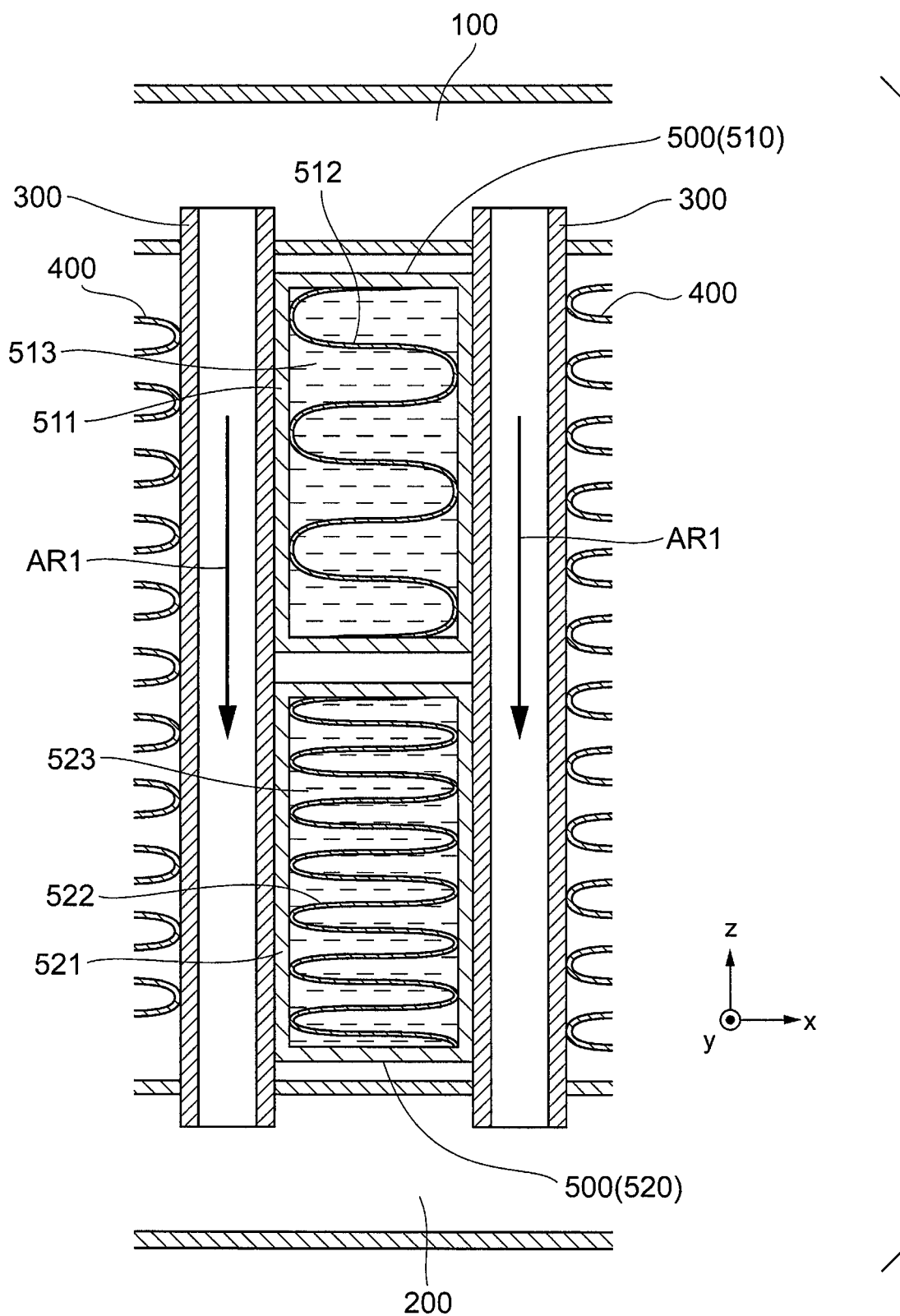
FIG. 21 is a diagram schematically showing a configuration of an evaporator according to a seventh embodiment of the present disclosure.
Figure 22:
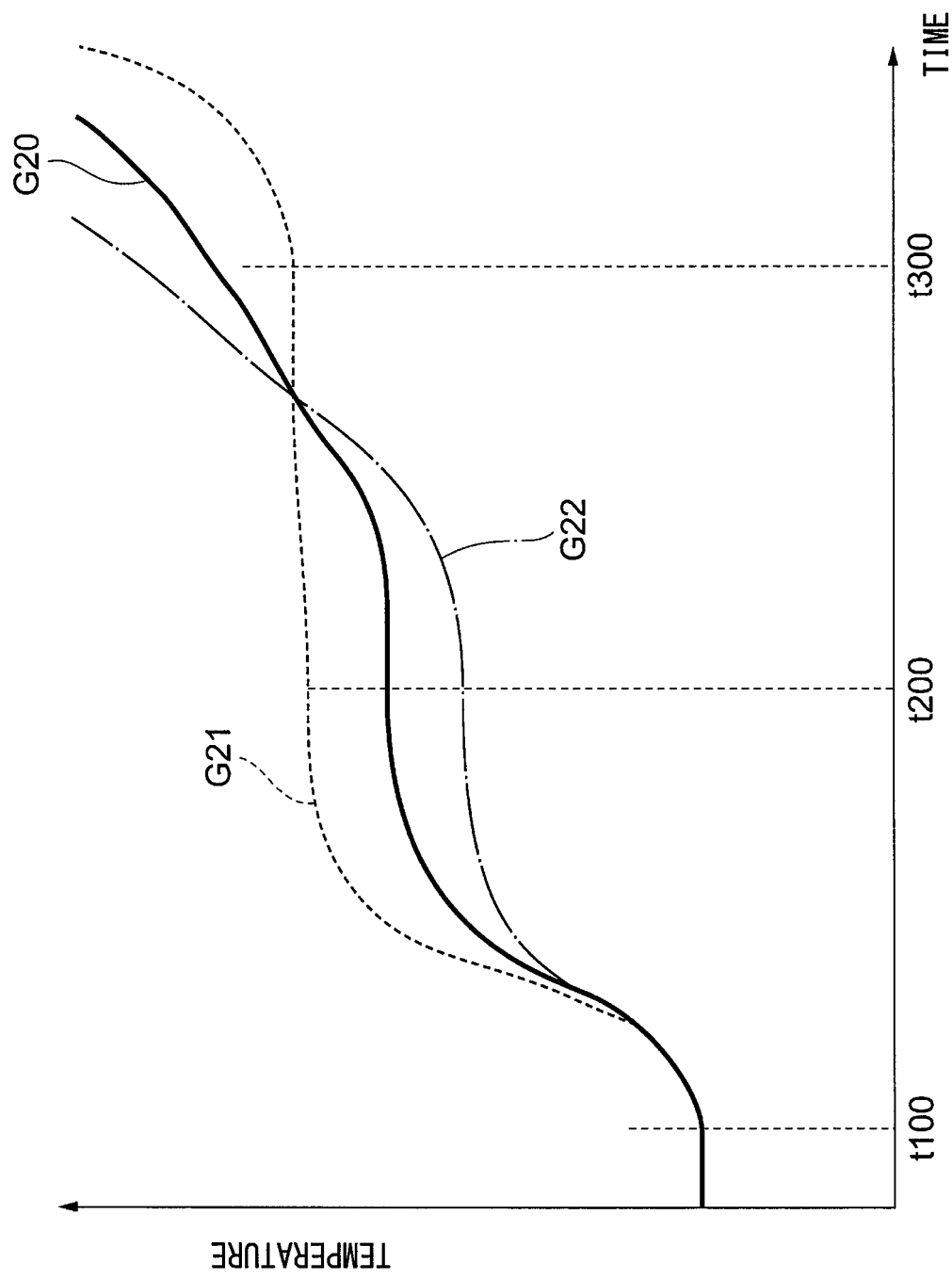
FIG. 22 is a graph showing a change in temperature of each part after transition to an idle stop state in the evaporator according to the seventh embodiment.

For example, as shown in FIG. 21, when the first cold storage mechanism 510 is disposed on the upper side, when a long period of time has elapsed since transition to the idle stop (time t30 in FIG. 22), the upper side becomes lower temperature, and the blowing temperature is controlled as described above. In other words, although the temperature (G22) of the cold storage material 523 is rising, the blowing temperature is kept lower than the above temperature.

On the other hand, contrary to the example of FIG. 21, when the second cold storage mechanism 520 is disposed on the upper side, only when a short period of time has elapsed since transition to the idle stop (time t20 in FIG. 22), the upper side becomes lower temperature, and the blowing temperature is controlled as described above. In other words, although the temperature (G21) of the cold storage material 513 is rising, the blowing temperature is kept lower than the above temperature.

In the case where it is desired to cool the air over a long period (when it is desired to exhibit the effect at the timing of the time t30) while permitting the blowing temperature to rise to some extent after transition to the idle stop, the first cold storage mechanism 510 may be disposed on the upper side as shown in FIG. 21. On the other hand, in the case where it is desired to minimize an increase in the temperature of the air in the corresponding period (when it is desired to exhibit the effect at the timing of the time t20) while permitting the cooling of the air to finish in a short period after transition to the idle stop, the second cold storage mechanism 520 may be disposed on the upper side contrary to FIG. 21.

Eighth Embodiment

An eighth embodiment of the present disclosure will be described. Although not shown, in the present embodiment, a shape of a cold storage container 511 and a shape of a cold storage container 521 are the same as each other, and are identical with the shape of the cold storage container 511 shown in FIG. 1. In addition, a shape of an inner fin 512 and a shape of an inner fin 522 are the same as each other, and are identical with the shape of the inner fin 512 shown in FIG. 1. In other words, in the present embodiment, a first cold storage mechanism 510 and a second cold storage mechanism 520 are identical in structure with each other. However, in the present embodiment, a cold storage material 513 of the first cold storage mechanism 510 and a cold storage material 523 of the second cold storage mechanism 520 are different from each other. Other configurations are the same as those of the first embodiment shown in FIG. 1 and the like.

The cold storage material 513 is made of paraffin (C15) having 15 carbons, and a melting point of the cold storage material 513 is 9° C. The cold storage material 523 is made of paraffin (C16) having 16 carbons, and a melting point of the cold storage material 523 is 17° C. As described above, a melting point of the cold storage material 523 in the second cold storage mechanism 520 is set to be higher than a melting point of the cold storage material 513 in the first cold storage mechanism 510.

Figure 23A:
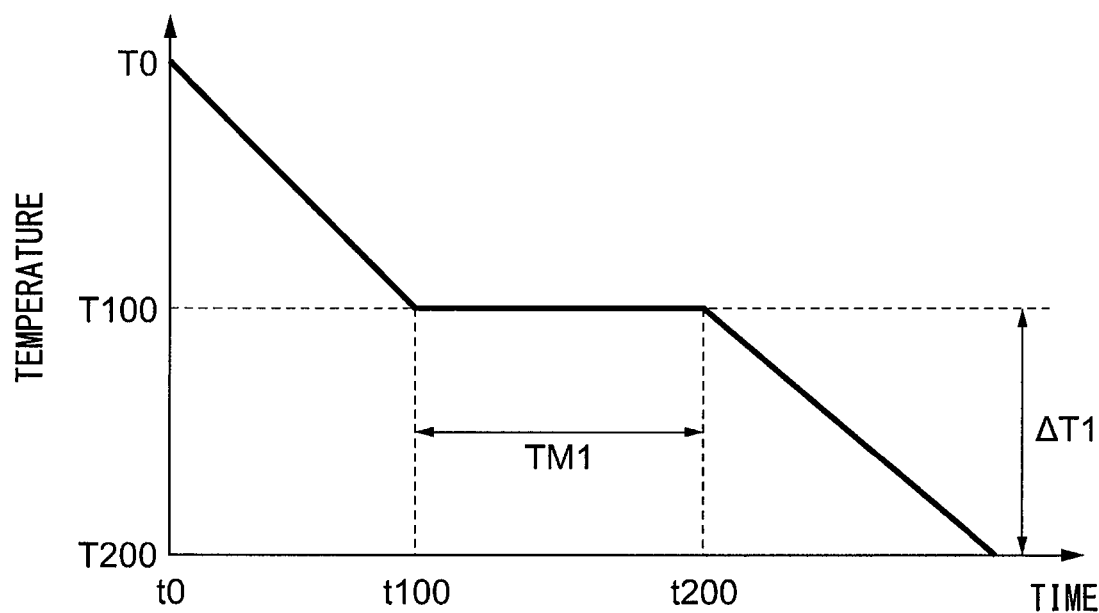
FIG. 23A is a diagram showing an example of a change in temperature of a cold storage material in a first cold storage mechanism of an evaporator according to an eighth embodiment of the present disclosure.

The advantages of different melting points of the cold storage material will be described with reference to FIGS. 23A and 23B. FIG. 23A shows a change in the temperature of the cold storage material 513 when the first cold storage mechanism 510 according to the present embodiment is cooled by the refrigerant in the tube 300. In FIG. 23A, the melting point of the cold storage material 513 is indicated as a melting point T100. In addition, in FIG. 23A, the temperature of the cold storage material 513 at the time of start to cool at time a t0 is indicated as an initial temperature T0. Further, the temperature of the refrigerant in the tube 300 is indicated as a refrigerant temperature T200. The refrigerant temperature T200 is lower than both of the initial temperature T0 and the melting point T100. In addition, the initial temperature T0 is higher than the melting point T100.

As shown in FIG. 23A, the temperature of the cold storage material 513 gradually decreases after the time t0 and becomes the melting point T100 at a time t100. From the time t100, the cold storage material 513 starts to solidify, and the entire cold storage material 513 is solidified at a time t200. In a period TM1 from the time t100 to the time t200, the temperature of the cold storage material 513 is kept constant (melting point T100). After the time t200, the temperature of the cold storage material 513 decreases again.

Figure 23B:
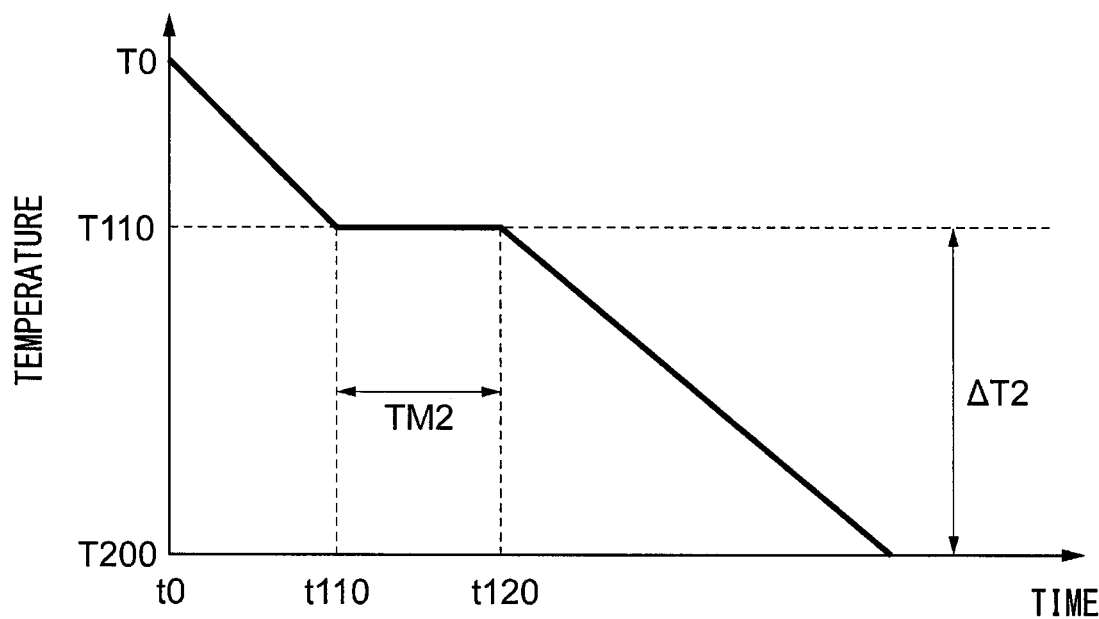
FIG. 23B is a diagram showing an example of a change in temperature of a cold storage material in a second cold storage mechanism of the evaporator according to the eighth embodiment.

FIG. 23B shows a change in the temperature of the cold storage material 523 when the second cold storage mechanism 520 according to the present embodiment is cooled by the refrigerant in the tube 300. In FIG. 23B, the melting point of the cold storage material 523 is indicated as a melting point T110. As already described above, the melting point T110 is higher than the melting point T100.

In FIG. 23B, the temperature of the cold storage material 523 at the time of start cooling at a time t0 is indicated as an initial temperature T0. Further, in FIG. 23B, the temperature of the refrigerant in the tube 300 is indicated as a refrigerant temperature T200. The initial temperature T0 and the refrigerant temperature T200 are the same as the initial temperature T0 and the refrigerant temperature T200 shown in FIG. 23A, respectively. In addition, the melting point T110 is a temperature lower than the initial temperature T0.

Similarly, in an example of FIG. 23B, the temperature of the cold storage material 523 gradually decreases after the time t0 and becomes the melting point T110 at the time t110. From the time t110, the cold storage material 523 starts to solidify, and the entire cold storage material 523 is solidified at the time t120. In a period TM2 from the time t110 to the time t120, the temperature of the cold storage material 523 is kept constant (melting point T110). After the time t120, the temperature of the cold storage material 523 decreases again.

In this example, a temperature difference between the cold storage material 513 and the refrigerant when the cold storage material 513 is solidifying is defined as a temperature difference $\Delta T1$. In addition, a temperature difference between the cold storage material 523 and the refrigerant when the cold storage material 523 is solidifying is defined as a temperature difference $\Delta T2$. In this case, since the melting point T110 of the cold storage material 523 is higher than the melting point T100 of the cold storage material 513, the temperature difference $\Delta T2$ is larger than the temperature difference $\Delta T1$. For that reason, a speed at which the heat is drawn from the cold storage material 523 in the period TM2 is higher than a speed at which the heat is drawn from the cold storage material 513 in the period TM1. As a result, a length of the period TM2 is shorter than a length of the period TM1.

In the present embodiment, since the material having a high melting point is used as the cold storage material 523, the cold storage material 523 solidifies more quickly than the cold storage material 513. In other words, the cold storage and release performance of the second cold storage mechanism 520 is higher than the cold storage and release performance of the first cold storage mechanism 510. As a result, the same advantages as those in the first embodiment can be obtained. As a specific material of each of the cold storage material 513 and the cold storage material 523, a material different from the materials described above may be used.

Ninth Embodiment

Figure 24A:
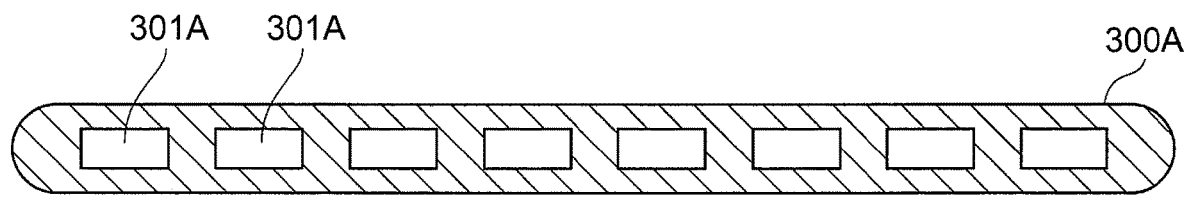
FIG. 24A is a cross-sectional view showing a tube that is in contact with a first cold storage mechanism of an evaporator according to a ninth embodiment of the present disclosure.
Figure 24B:
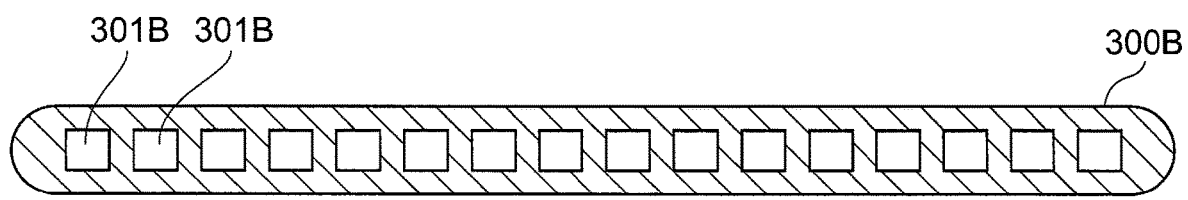
FIG. 24B is a cross-sectional view showing a tube that is in contact with a second cold storage mechanism of an evaporator according to the ninth embodiment.

A ninth embodiment of the present disclosure will be described with reference to FIGS. 24A and 24B. Although not shown, in the present embodiment, a shape of a cold storage container 511 and a shape of a cold storage container 521 are the same as each other, and are identical with the shape of the cold storage container 511 shown in FIG. 1. In addition, a shape of an inner fin 512 and a shape of an inner fin 522 are the same as each other, and are identical with the shape of the inner fin 512 shown in FIG. 1. In other words, in the present embodiment, a first cold storage mechanism 510 and a second cold storage mechanism 520 are identical in structure with each other. However, in the present embodiment, the shape of a tube 300 in a part is different from that in the first embodiment. Other configurations are the same as those of the first embodiment shown in FIG. 1 and the like.

Hereinafter, one of the multiple tubes 300 which is in contact with the first cold storage mechanism 510 will be referred to as "tube 300A". Also, one of the multiple tubes 300 which is in contact with the second cold storage mechanism 520 will be referred to as "tube 300B". FIG. 24A is a cross-sectional view when the tube 300A is cut along a vertical plane in a flow direction of the refrigerant. FIG. 24B is a cross-sectional view when the tube 300B is cut along a vertical plane in the flow direction of the refrigerant. Both of the tube 300A and the tube 300B are formed by extrusion molding of aluminum.

Multiple flow channels 301 (hereinafter, referred to as "flow channels 301A") provided in the tube 300A are formed in the tube 300A, and the sectional shapes of the flow channels 301 are rectangular. The respective flow channels 301A are arrayed in a line at a fixed pitch.

Likewise, the multiple flow channels 301 (hereinafter, referred to as "flow channels 301B") provided in the tube 300B are formed in the tube 300B, and the sectional shapes of the flow channels 301 are rectangular. The respective flow channels 301B are arrayed in a line at a fixed pitch. However, a flow channel cross-sectional area of each flow channel 301B is smaller than a flow channel cross-sectional area of each flow channel 301A. In addition, an arrangement pitch of the flow channel 301B is narrower than an arrangement pitch of the flow channel 301A. When comparing the tube 300A with the tube 300B, a contact area between the flow channel 301B and the refrigerant is larger than a contact area between the flow channel 301A and the refrigerant. As a result, the heat storage-and-radiation performance of the second cold storage mechanism 520 is relatively higher than the heat storage-and-radiation performance of the first cold storage mechanism 510. Even in such a configuration, the same advantages as those in the first embodiment are obtained.

The "contact area between the flow channel 301B and the refrigerant" is an area obtained by totaling areas of the inner surfaces of the flow channels 301B for all the flow channels 301B provided in one tube 300B. The "contact area between the flow channel 301A and the refrigerant" is defined similarly.

The modification of the ninth embodiment described above will be described with reference to FIGS. 25A and 25B. Similarly, in the above modification, a shape of the cold storage container 511 and a shape of the cold storage container 521 are the same as each other, and are identical with the shape of the cold storage container 511 shown in FIG. 1. In addition, a shape of the inner fin 512 and a shape of the inner fin 522 are the same as each other, and are identical with the shape of the inner fin 512 shown in FIG. 1.

Figure 25A:
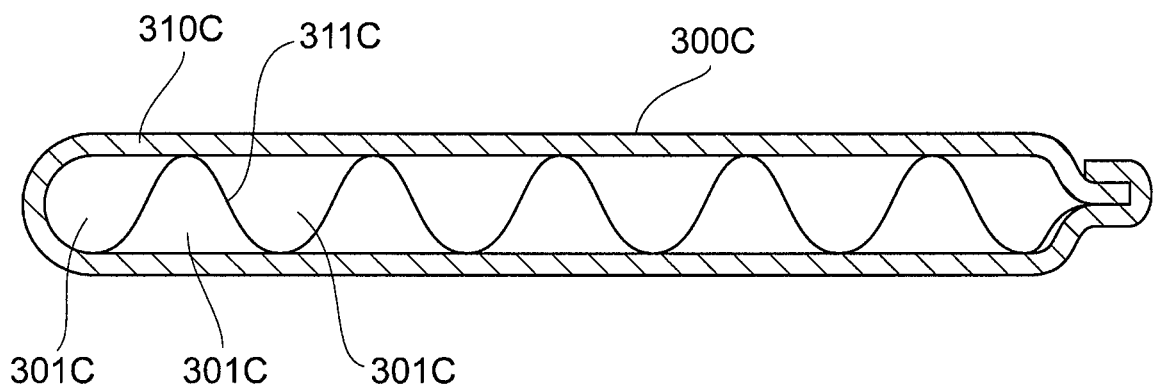
FIG. 25A is a cross-sectional view showing a tube that is in contact with a first cold storage mechanism of an evaporator according to a modification of the ninth embodiment.
Figure 25B:
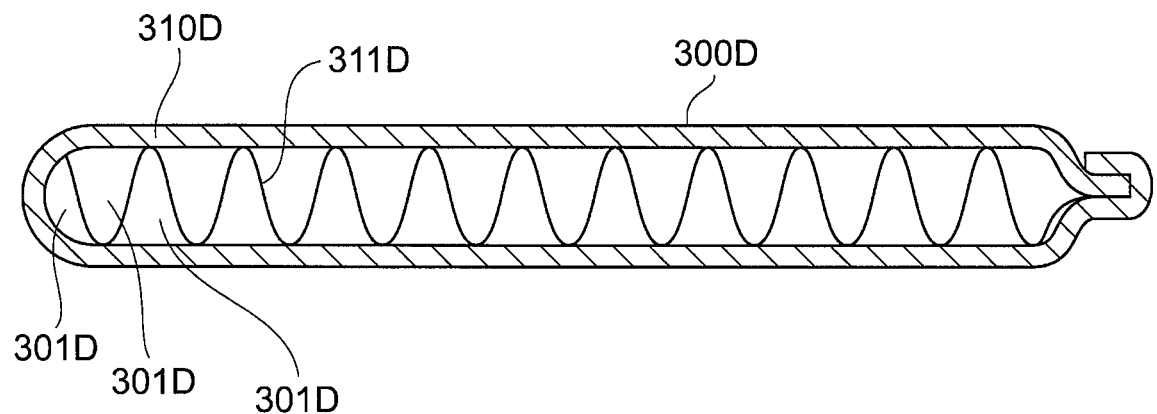
FIG. 25B is a cross-sectional view showing a tube that is in contact with a second cold storage mechanism of an evaporator according to a modification of the ninth embodiment.

In this modification, a tube 300C shown in FIG. 25A is used instead of the tube 300A. In addition, a tube 300D shown in FIG. 25B is used instead of the tube 300B. FIG. 25A is a cross-sectional view when the tube 300C is cut along a vertical plane in a flow direction of the refrigerant. FIG. 25B is a cross-sectional view when the tube 300D is cut along the vertical plane along the flow direction of the refrigerant.

The tube 300C has a container 310C and a fin 311C. The container 310C is a container formed by bending a metal plate and crimping an end portion of the metal plate, and a cross section of the container is flattened.

As with a corrugated fin 400, the fin 311C is formed by bending a metal plate (aluminum) into a wavy shape. Apexes of the fin 311C which is formed in the wavy shape abut against an inner wall surface of the container 310C and are brazed to the inner wall surface. As a result, the internal space of the container 310C is partitioned into multiple spaces by the fin 311C. Each space serves as a flow channel 301C through which the refrigerant flows.

The tube 300D has the same configuration as that in the above tube. The tube 300D has a container 310D and a fin 311D. The container 310D is a container formed by bending a metal plate and crimping an end portion of the metal plate, and a cross section of the container is flattened.

As with the corrugated fin 400, the fin 311D is formed by bending a metal plate (aluminum) into a wavy shape. Apexes of the fin 311D which is formed in the wavy shape abut against an inner wall surface of the container 310D and are brazed to the inner wall surface. As a result, the internal space of the container 310D is partitioned into multiple spaces by the fin 311D. Each space serves as a flow channel 301D through which the refrigerant flows.

As shown in FIGS. 25A and 25B, a pitch of the fin 311D, that is, a spacing between the adjacent apexes in the fin 311D is narrower than a pitch of the fin 311C, that is, a spacing between adjacent apexes in the fins 311C. As a result, similarly, in this modification, a contact area between the flow channel 301D and the refrigerant is larger than a contact area between the flow channel 301C and the refrigerant. As a result, the heat storage-and-radiation performance of the second cold storage mechanism 520 is relatively higher than the heat storage-and-radiation performance of the first cold storage mechanism 510. Even in such a configuration, the same advantages as those in the first embodiment are obtained.

An embodiment of the present disclosure is described heretofore with reference to specific examples. However, the present disclosure is not limited to the specific examples. That is, the specific examples after appropriately modified in design by those skilled in the art are to be included in the scope of the present disclosure, provided that the modified specific examples include the features of the present disclosure. For example, each element included in above each specific example and the arrangement, the material, the condition, the shape, and the size thereof are not limited to the illustrations and can be appropriately modified. In addition, the respective elements of the embodiments described above can be combined insofar as the combination is technically available, and such combinations are included in the scope of the present disclosure insofar as the combinations have the properties and features of the present disclosure.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. An evaporator that cools air by heat exchange with a refrigerant passing through an inside of the evaporator, the evaporator comprising:
   a first cold storage mechanism including a first cold storage container housing a first cold storage material that decreases in temperature by a heat exchange with the refrigerant; and
   a second cold storage mechanism including a second cold storage container housing a second cold storage material that decreases in temperature by a heat exchange with the refrigerant, wherein
   the second cold storage mechanism is higher in heat storage-and-radiation performance than the first cold storage mechanism.

2. The evaporator according to claim 1, wherein
   both the first cold storage mechanism and the second cold storage mechanism are disposed in a state of being in contact with a tube through which the refrigerant passes, and
   a contact area between the second cold storage mechanism and the tube is larger than a contact area between the first cold storage mechanism and the tube, thereby relatively increasing the heat storage-and-radiation performance of the second cold storage mechanism.

3. The evaporator according to claim 1, wherein
   a contact area between the second cold storage container and the second cold storage material in the second cold storage mechanism is larger than a contact area between the first cold storage container and the first cold storage material in the first cold storage mechanism.

4. The evaporator according to claim 1, wherein
   the first cold storage mechanism includes a first inner fin housed in the first cold storage container to promote a heat transfer to the first cold storage material, and wherein
   the second cold storage mechanism includes a second inner fin housed in the second cold storage container to promote a heat transfer to the second cold storage material.

5. The evaporator according to claim 4, wherein
   a contact area between the second cold storage container and the second inner fin in the second cold storage mechanism is larger than a contact area between the first cold storage container and the first inner fin in the first cold storage mechanism.

6. The evaporator according to claim 4, wherein
   a contact area between the second inner fin and the second cold storage material in the second cold storage mechanism is larger than a contact area between the first inner fin and the first cold storage material in the first cold storage mechanism.

7. The evaporator according to claim 4, wherein
   the first inner fin is corrugated to have surfaces facing each other and a midpoint distance between two facing surfaces of the first inner fin is a first phase change distance, and wherein
   the second inner fin is corrugated to have surfaces facing each other and a midpoint distance between two facing surfaces of the second inner fin is a second phase change distance, and wherein
   the second phase change distance in the second cold storage mechanism is smaller than the first phase change distance in the first cold storage mechanism.

8. The evaporator according to claim 4, wherein
   the first inner fin is formed by bending a metal plate in a first wavy shape, and wherein
   the second inner fin is formed by bending a metal plate in a second wavy shape, and wherein
   the first wavy shape of the first inner fin in the first cold storage mechanism is different than the second wavy shape of the second inner fin in the second cold storage mechanism, or a material of the first inner fin is different than a material of the second inner fin.

9. The evaporator according to claim 8, wherein
   a pitch of the second inner fin in the second cold storage mechanism is smaller than a pitch of the first inner fin in the first cold storage mechanism.

10. The evaporator according to claim 8, wherein
    a thickness of the second inner fin in the second cold storage mechanism is larger than a thickness of the first inner fin in the first cold storage mechanism.

11. The evaporator according to claim 8, wherein
    a thermal conductivity of the second inner fin in the second cold storage mechanism is larger than a thermal conductivity of the first inner fin in the first cold storage mechanism.

12. The evaporator according to claim 1, wherein
    a thermal conductivity of the second cold storage material in the second cold storage mechanism is larger than a thermal conductivity of the first cold storage material in the first cold storage mechanism.

13. The evaporator according to claim 1, wherein
    the first cold storage mechanism and the second cold storage mechanism are disposed next to each other and aligned in a vertical direction.

14. The evaporator according to claim 1, wherein
    the first cold storage mechanism and the second cold storage mechanism are disposed next to each other and aligned in a direction in which the air passes.

15. The evaporator according to claim 1, further comprising:
    a plurality of tubes through which the refrigerant passes; and
    a tank that performs at least one of supply of the refrigerant to the plurality of tubes and reception of the refrigerant which has passed through the plurality of tubes, wherein
    the second cold storage mechanism is disposed in a core portion where the plurality of tubes are disposed, and
    the first cold storage mechanism is disposed at a position different from the core portion and adjacent to the tank.

16. The evaporator according to claim 1, wherein
a melting point of the second cold storage material in the second cold storage mechanism is higher than a melting point of the first cold storage material in the first cold storage mechanism.

17. The evaporator according to claim 1, further comprising a plurality of tubes each having therein a flow channel through which the refrigerant passes, wherein
both the first cold storage mechanism and the second cold storage mechanism are disposed in contact with the tubes, and
a contact area between the flow channel of one of the tubes which is in contact with the second cold storage mechanism and the second cold storage material is larger than a contact area between the flow channel of another of the tubes which is in contact with the first cold storage mechanism and the first cold storage material, thereby relatively increasing the heat storage-and-radiation performance of the second cold storage mechanism.

18. The evaporator according to claim 4, wherein
the first inner fin is a metal plate formed in a first corrugated shape, and
the second inner fin is a metal plate formed in a second corrugated shape,
the first corrugated shape of the first inner fin in the first cold storage mechanism is different than the second corrugated shape of the second inner fin in the second cold storage mechanism, or a material of the first inner fin is different than a material of the second inner fin.

19. The evaporator according to claim 1, further comprising a plurality of tubes each having therein a flow channel through which the refrigerant passes, wherein
both the first cold storage mechanism and the second cold storage mechanism are disposed in contact with the tubes, and
a contact area between the flow channel of one of the tubes which is in contact with the second cold storage mechanism and the refrigerant is larger than a contact area between the flow channel of another of the tubes which is in contact with the first cold storage mechanism and the refrigerant, thereby relatively increasing the heat storage-and-radiation performance of the second cold storage mechanism.

20. The evaporator according to claim 1, further comprising:
a plurality of tubes in which the refrigerant passes, the plurality of tubes being stacked in a stacking direction; and
a plurality of spaces provided between the plurality of tubes,
the plurality of spaces configured to contain at least one of
a corrugated fin,
the first cold storage mechanism, and
the second cold storage mechanism, wherein
the corrugated fin, the first cold storage mechanism, and the second cold storage mechanism are arranged along the stacking direction with a sequential repeating pattern of at least one of the first cold storage mechanism, the corrugated fin, and the second cold storage mechanism.

21. An evaporator that cools air by heat exchange with a refrigerant passing through an inside of the evaporator, the evaporator comprising:
a plurality of tubes through which the refrigerant passes;
a first cold storage mechanism held between the plurality of tubes and including a first cold storage container housing a first cold storage material that decreases in temperature by a heat exchange with the refrigerant; and
a second cold storage mechanism held between the plurality of tubes and including a second cold storage container housing a second cold storage material that decreases in temperature by a heat exchange with the refrigerant, wherein
the second cold storage mechanism is higher in heat storage-and-radiation performance than the first cold storage mechanism.

22. An evaporator that cools air by heat exchange with a refrigerant passing through an inside of the evaporator, the evaporator comprising:
a first cold storage mechanism including a first cold storage container housing a first cold storage material that decreases in temperature by a heat exchange with the refrigerant; and
a second cold storage mechanism including a second cold storage container housing a second cold storage material that decreases in temperature by a heat exchange with the refrigerant, wherein
the second cold storage mechanism is higher in cold heat storage performance than the first cold storage mechanism.

23. An evaporator that cools air by heat exchange with a refrigerant passing through an inside of the evaporator, the evaporator comprising:
a first cold storage mechanism including a first cold storage container housing a first cold storage material that decreases in temperature by a heat exchange with the refrigerant; and
a second cold storage mechanism including a second cold storage container housing a second cold storage material that decreases in temperature by a heat exchange with the refrigerant, wherein
the second cold storage mechanism is higher in cold heat release performance than the first cold storage mechanism.

* * * * *